United States Patent [19]
Schwarz

[11] 4,096,557
[45] Jun. 20, 1978

[54] CONTROLLABLE FOUR QUADRANT A.C. TO A.C. AND D.C. CONVERTER EMPLOYING AN INTERNAL HIGH FREQUENCY SERIES RESONANT LINK

[76] Inventor: Francisc C. Schwarz, Round Hill Rd., Lincoln, Mass. 01773

[21] Appl. No.: 645,208

[22] Filed: Dec. 29, 1975

Related U.S. Application Data

[63] Continuation-in-part of Ser. No. 474,788, May 30, 1974, Pat. No. 3,953,779.

[51] Int. Cl.² ............................................. H02M 5/45
[52] U.S. Cl. .......................................... 363/9; 363/160
[58] Field of Search ..................... 321/1, 4, 7, 69 R; 328/15; 363/2, 9, 159, 160, 161

[56] References Cited

U.S. PATENT DOCUMENTS

| | | | |
|---|---|---|---|
| 3,487,289 | 12/1969 | McMurray | 321/69 R |
| 3,582,756 | 6/1972 | McMurray | 321/7 |
| 3,678,367 | 7/1972 | McMurray | 321/7 |
| 3,742,336 | 6/1973 | Bedford | 321/7 |
| 3,835,364 | 9/1974 | Van Rooy | 321/45 R |
| 3,882,369 | 5/1975 | McMurray | 321/7 |
| 3,959,720 | 5/1976 | Bose et al. | 321/7 |

*Primary Examiner*—William M. Shoop
*Attorney, Agent, or Firm*—Stein & Frijouf

[57] ABSTRACT

Disclosed is a bilateral device to transform a.c. polyphase power to controllable a.c. or d.c. power, or to perform this transformation in reverse, by use of a single high frequency link comprising series resonant circuits. A cyclo-up converter transforms the incoming low frequency power to substantially higher frequencies of the order of kilohertz directly and without the interposition of a d.c. link, and thus, without the therewith associated low pass filters. The high frequency link includes series resonant circuits which facilitate the natural current commutation of electronic switching elements, such as controlled rectifiers. The energy is transformed from the high frequency link to a lower frequency output circuit via a cyclo-down converter, as well known in the art. Again, no d.c. link is used for the process. The low frequency output circuit referred to above, can operate at zero frequency and thus feed a d.c. load.

17 Claims, 15 Drawing Figures

| PHASE VOLTAGES OPERATING PHASES | | | $e_1 > e_2$ 1 − 2 | $e_1 > e_3$ 1 − 3 | $e_2 > e_3$ 2 − 3 | $e_2 > e_1$ 2 − 1 | $e_3 > e_1$ 3 − 1 | $e_3 > e_2$ 3 − 2 |
|---|---|---|---|---|---|---|---|---|
| THYRISTOR PAIRS CR | $i_1 > 0$ | FWD | 11, 24 | 11, 34 | 21, 34 | 21, 14 | 31, 14 | 31, 24 |
| | | REV | 14, 21 | 14, 31 | 24, 31 | 24, 11 | 34, 11 | 34, 21 |
| | $i_1 < 0$ | FWD | 13, 22 | 13, 32 | 23, 32 | 23, 12 | 33, 12 | 33, 22 |
| | | REV | 12, 23 | 12, 33 | 22, 33 | 22, 13 | 32, 13 | 32, 23 |

REQUISITE CONDITIONS FOR FIRING OF CONTROLLED RECTIFIERS CRIJ BY FIRING PULSE GENERATORS (FPG) FOR FORWARD (FW) OR REVERS (REV) CONDUCTION OF THE RESONANT CURRENT; INDICATED BY x. *

| FPG FW for CR | DISCRIMINATOR | | | | | | BACK BIAS SIGNAL VERIFIED ON CR | | | | | | | | | | | | FPG REV for CR |
|---|---|---|---|---|---|---|---|---|---|---|---|---|---|---|---|---|---|---|---|
| | DE 12 + | DE 12 - | DE 13 + | DE 13 - | DE 23 + | DE 23 - | 11 / 24 | 12 / 23 | 11 / 34 | 12 / 33 | 21 / 34 | 22 / 33 | 21 / 14 | 22 / 13 | 31 / 14 | 23 / 13 | 31 / 24 | 32 / 23 | |
| 11 | x | | x | | | | x | | | | | | | | | | | | 13 |
| 12 | x | | x | | | | | x | | | | | | | | | | | 14 |
| 21 | o | x | | | x | | | | | | x | | | | | | | | 23 |
| 22 | o | x | | | x | | | | | | | x | | | | | | | 24 |
| 31 | | | o | x | o | x | | | | | | | x | | | | | | 33 |
| 32 | | | o | x | o | x | | | | | | | | x | | | | | 34 |
| 33 | | | x | x | x | x | | | x | | | | | | | | | | 32 |
| 34 | | | x | x | x | x | | | | x | | | | | | | | | 31 |
| 23 | x | | | | o | x | | x | | | | | | | | | | x | 22 |
| 24 | x | | | | o | x | x | | | | | | | | | | x | | 21 |
| 13 | o | x | x | x | | | | | | | | | | | | x | | | 12 |
| 14 | o | x | x | x | | | | | | | | | | x | | | | | 11 |

FIG. 8

* Conditions associated with (1) direct short circuits between a.c. lines caused by inappropriate firing of CR's and with (2) output voltage or current control are not included.

CONTROLLABLE FOUR QUADRANT A.C. TO A.C. AND D.C. CONVERTER EMPLOYING AN INTERNAL HIGH FREQUENCY SERIES RESONANT LINK

CROSS-REFERENCE TO RELATED APPLICATION

This is a continuation-in-part of prior application Ser. No. 474,788 now U.S. Pat. No. 3,953,779.

BACKGROUND OF THE INVENTION

This invention relates to power converters which transform electric energy from a polyphase a.c. source to an a.c. of other voltage, frequency, or waveform or to d.c. Or in reverse, it can receive electric energy from an a.c. or d.c. source and transform it to polyphase a.c. power of other voltage, frequency or waveform.

Static power converters, as just described, are well known in the art. One representative group of this kind is the antiparallel, full wave, three phase thyristor bridge. This bridge is, primarily, used for controlled a.c. to d.c. conversion; it has found wide application for that purpose and is presently one of the important implements of electric power technology. One area of application is the controlled drive of d.c. machines used in elevators, rolling mills and other cases which require motor speed control and reversal of direction of rotation. The above named thyristor bridge is also used as one functional element in tandem with a four quadrant inverter to form one four quadrant converter. This converter transforms polyphase a.c. power with one voltage and frequency to a.c. power with another voltage and frequency. The above named thyristor bridge performs, therefore, a valuable and needed function in present day technology.

The functional principles of the thyristor bridge impose certain constraints on its use. A brief summary of some of these limiations follows. The bridge (1) requires protection against the occurrence of excessive currents in the conducting thyristors which can be caused by even temporary over loads associated with dynamic load conditions. The therewith associated protection requires (2) subordination of load performance to the limitations of the bridge and (3) utilization of individual thyristor turn-off circuits which in turn require doubling of the number of 12 thyristors for a three phase a.c. supply line to 24 thyristors with comparable v-i ratings. The bridge requires, furthermore, (4) fuse protection in case the load current should rise faster than compatible with the above referred to thyristor turn-off mechanisms. Reaction speed of the named thyristor bridge is (5) limited to approximately 2.8 milliseconds, being one-sixth of the 16.66 ms. period of a 60 Hz system and is actually slower because of the facts cited under (1) above. Use of thyristor bridges of the named kind requires in many cases utilization of low pass filters in the input or in the output circuit of the bridge, or both. It is the purpose of the (6) input filter to prevent pollution of the a.c. supply network caused by application of the well-known principle of phase angle control which causes distortion in the supply voltage waves. This distortion can interfere with the utilization of the same supply line by other users which may require limitation of harmonic distortions in that line to prescribed tolerances. Low pass filters with a cut-off frequency above, but near 60 Hz are required for that purpose in the individual lines of the polyphase network. The purpose of the (7) output filter is to smooth the thyristor switched load current to prevent unnecessary ohmic losses in the load which would be caused by the presence of significant higher harmonic components in this current. Another problem is associated with the (8) power factor, as viewed from the supply line. This power factor depends on the characteristics of input and output filters as cited under limitations (6) and (7) above, respectively; it also depends on the conditions of loading, which, in turn, determines the cut in phase angle of the thyristors of the bridge. This power factor is, in many cases, unfavorable in the most important "active region" of control of the control phase angle $\alpha_{min} < \alpha < \alpha_{max}$ for given conditions. A low power factor in the a.c. supply line results in a poor utilization of the feeding generator and of the therewith associated means of power transmission, due to additional ohmic losses in these power system components. The same low power factor causes also added losses in the bridge, the therewith associated filters, and in the load if the filters are inadequate, meaning too light.

Virtually, all present day polyphase a.c. powered four quadrant converters apply the principle of phase angle control, described above, with reference to the thyristor bridge. They suffer, therefore, from the constraints and disadvantages as described above.

SUMMARY OF THE INVENTION

The invention consists of a type of power converters which transform polyphase a.c. power to controllable a.c. or to d.c. power and which perform the same process in reverse by interposing a high frequency link between the input and the output terminals which also include the the therewith associated electronic switches. A significant part of this high frequency link consists of switch controlled series resonant circuits to provide natural commutation of switched currents, especially, when thyristors are being used. This technique results in high efficiencies of power conversion at relatively high internal switching frequencies, presently, in the order of 10 kHz. The high internal frequency and the absence of low pass filters allow submillisecond reaction speed capabilities and contribute to system stability. Accordingly, it is an object of this invention to improve the technology of polyphase a.c. to a.c. and d.c. converters for four quadrant operation by the use of a high frequency link between the source of energy and the load, respectively, and by the avoidance of low pass filters with cut off frequencies below the kilohertz range.

It is a further object of this invention to increase the reaction speed capability of said converters by utilization of a frequency ratio between said high frequency link and the frequency of the polyphase a.c. supply of two orders of magnitude or more.

It is yet another object of this invention to retain an almost constant maximum power factor near 0.955 in a three-phase a.c. supply line for all conditions of loading and control of the converter output voltge or current.

It is yet a further object of the invention to perform its operation efficiently due to natural current commutation in all of its electronic switches, all of which process internal resonant currents.

It is another, further object of the invention to provide reliable operation which is due to the inherent current limiting capability of the converter and to the therefrom derived inherent avoidance of unforeseen excessive stresses on critical components.

It is yet another, further object of the invention to limit the electrical and physical size of all of its inductors, transformers and capacitors due to utilization of all of the converter components at, or near, the high internal frequency in the order of kilohertz. It is another and yet further object of the invention to avoid pollution of the network which supplies the polyphase a.c. power, a pollution which is otherwise caused as a side effect of the phase angle modulation process applied with thyristor bridges.

It is yet another, and yet further object of the invention to improve the cost effectiveness of said converters by way of a significant reduction of size of its components, as indicated above, and furthermore, by use of lower cost suitable magnetic materials, such as ferrites or other inexpensive ferromagnetic materials.

BRIEF DESCRIPTION OF THE DRAWINGS

The above mentioned and other objects of the invention will become apparent from the following detailed description of the invention when read in conjunction with the attached drawings:

FIG. 8 is a more detailed table of identification of individual thyristors associated with the cyclo-up conversion process and their requisite interrelations.

FIG. 10 also shows the common gating provisions for the thyristors of the cyclo-down converter.

DESCRIPTION OF THE PREFERRED EMBODIMENT

Figure 2:
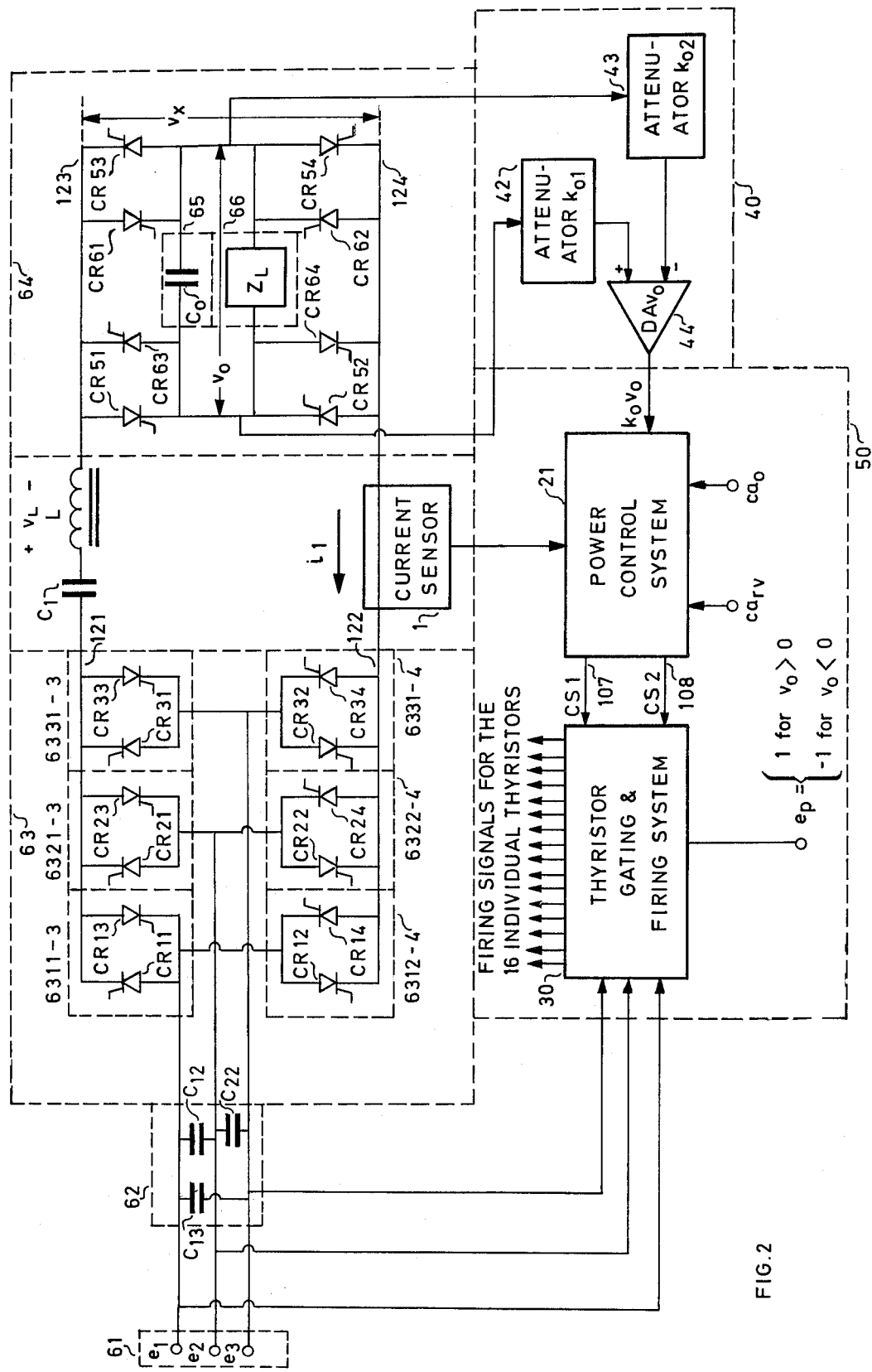
FIG. 2 is the schematic diagram of the transformerless and preferred embodiment of the power circuit with floating output terminals connected to its control system component presented in block diagram form.
Figure 3:
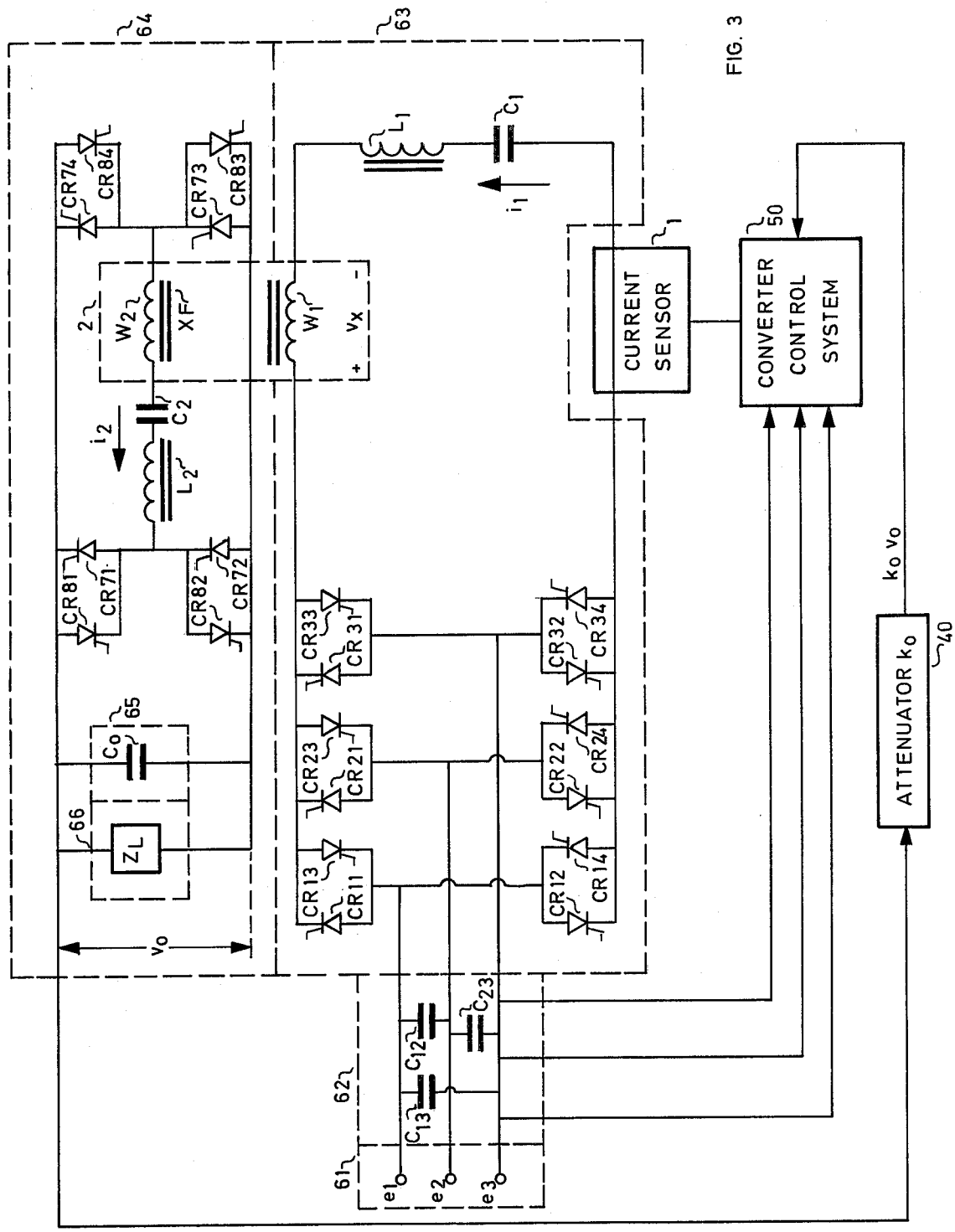
FIG. 3 is the schematic diagram of another embodiment power circuit which includes galvanic isolation between input and output power circuits; the power circuit is connected to its control system indicated in abbreviated block diagram form.
Figure 12:
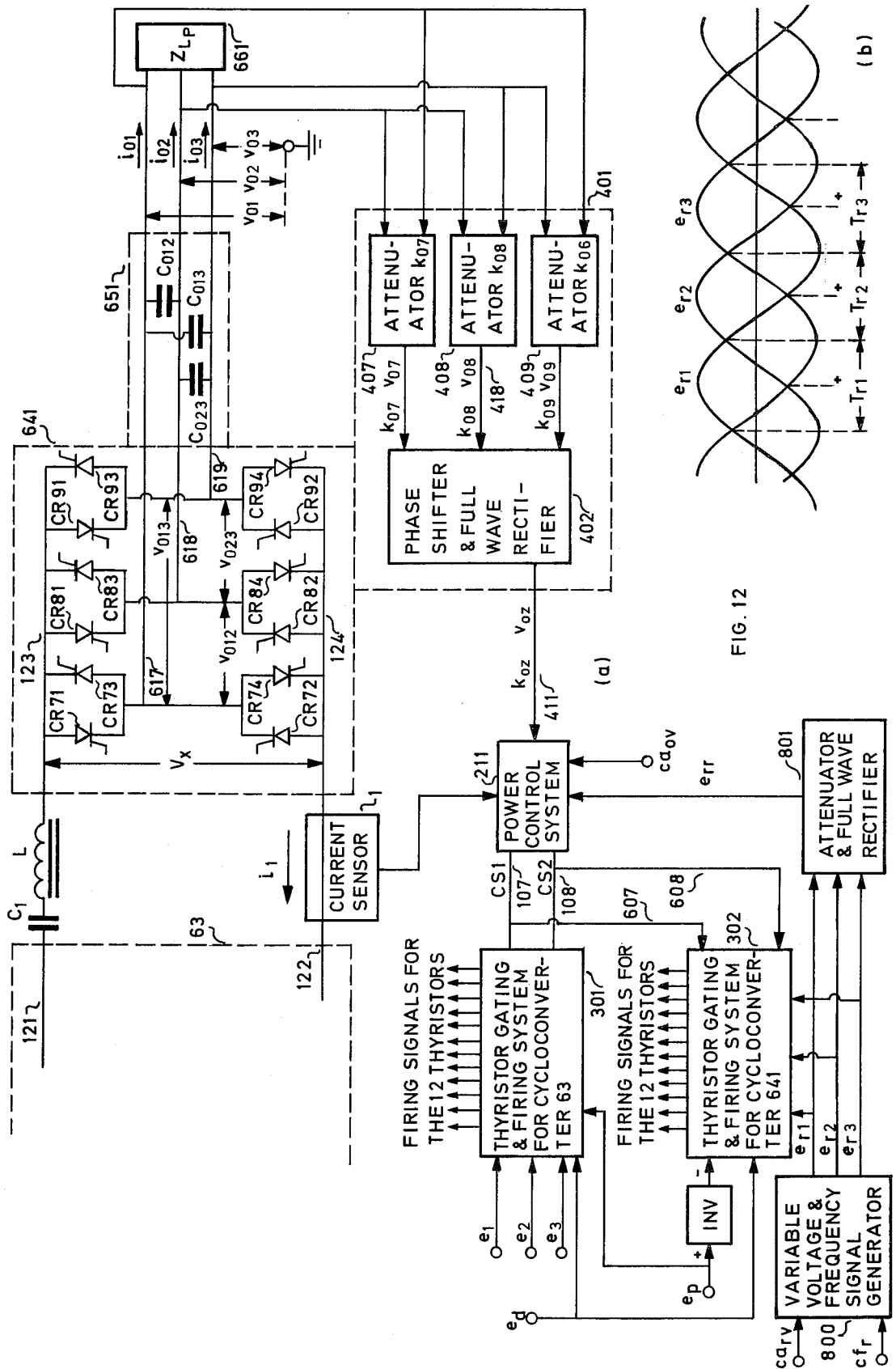
FIG. 12 shows the partial schematic for a polyphase a.c. to polyphase a.c. converter used in conjunction with part of the system described with reference to FIGS. 1 through 3.

In the drawings, inductors, capacitors, transformers, controlled rectifiers and resistors are designated by conventional symbols and by reference characters L, C, XF, CR and R with various subscripts respectively. In the specification and claims, the refcrence characters for inductors, capacitors, controlled rectifiers and resistors may also be used as algebraic symbols to represent the inductance in Henrys, the capacitance in Farads, and the resistance in Ohms of the several parts. In each case the sense of the usage will be clear from the context. The invention will be described as it is applied with use of series resonant circuits as shown in FIG. 2. However, the invention is not restricted to this use, as shown in FIGS. 3 and 12. It is readily applied to types of systems which transfer energy from a d.c. source or from a group of interdependent sources of energy to a d.c. or a.c. load or which perform the same process in reverse. These systems thus operate in the four quadrants of the v-i coordinates as viewed at the converter input or output terminals, respectively. Converters employing series resonant circuits for controlled transfer of energy are well known in the art and further described in the pending application for a U.S. Patent. See for example: U.S. Pat. No. 3,663,940, 1972; U.S. Pat. No. 3,953,779; U.S. Pat. No. 3,659,184; Bedford B.D. and Hoft, R.G., "Principles of Inverter Circuits", Wiley, New York, 1964.

Figure 1:
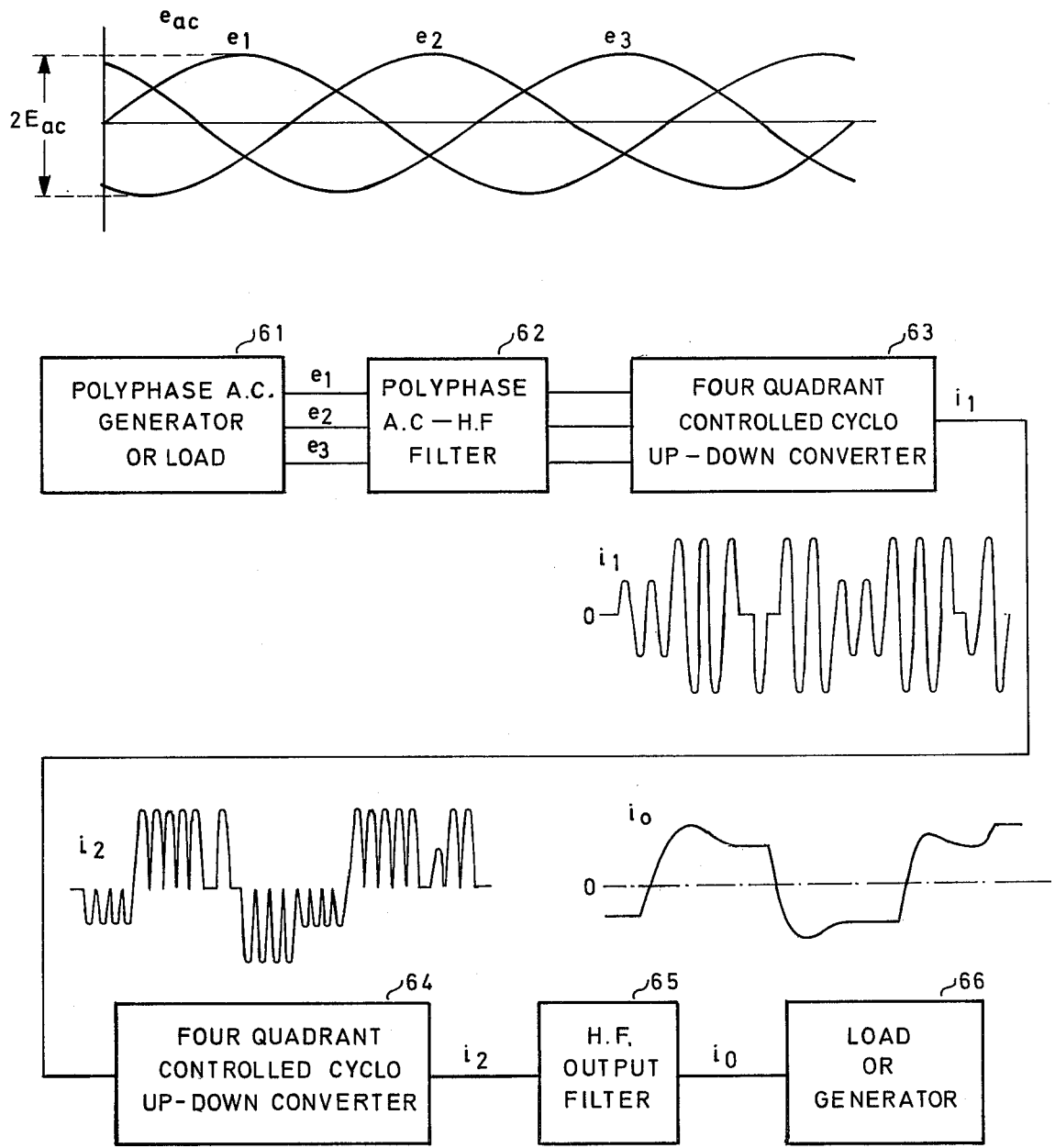
FIG. 1 is the block diagram of a four quadrant polyphase a.c. to a.c. or d.c. converter using direct conversion from a low power frequency to a high internal frequency by way of a cyclo-up converter, followed by a more conventional cyclo-down converter for a.c. or d.c. output.

The invention is now further described with reference to the attached figures. Referring now, specifically to FIG. 1: the converter derives its energy from a polyphase generator 61, illustrated here as a three phase sine wave generator, or from its thereto connected transmission line which becomes the converter's load in the case of reversal of power flow. The polyphase a.c. power enters the converter via a polyphase a.c. high frequency (a.c. — h.f.) filter 62. This filter has a cut off frequency that is lower than twice the lowest internal converter frequency, but which is approximately two orders of magnitude, or more, above the low frequency of the polyphase generator. The purpose of this filter is to isolate the effects of internal converter operation from the supply lines of a.c. power; a filter of rather small electrical and physical size is required to suppress the harmonic content generated by converter operation.

The significant part of the process of voltge or current waveform transformation is carried out in two successive steps. First a cyclo-up converter 63 derives energy from two of the three phases of the a.c. supply at one time, whichever two are suitable at a given time. Each cycle of the just described process of extraction of energy from any two phases is at most only as long as the cycle of the period of the converter's high frequency series resonant circuits which process all of the transferred power. The thyristors linking the two a.c. phases referred to above with the converter's series resonant circuits open automatically at the termination of the series resonant current $i_1$. Other thyristors associated with the same a.c. phases or with other phases provide current conduction during the following high frequency (h.f.) cycle. Thus, the converter derives electric energy from two a.c. phase at one time selectively and in a succession of individual h.f. pulses. The just described mode of operation is characterized as a cyclo-up converter, since the a.c. generator frequency, such as 60 Hz, is stepped up to the multikilohertz range with full transfer of energy. Frequency modulation and the therefrom resulting resonant current amplitude modulation (see the above cited references) of the series resonant power circuits control the rate of power flow into the converter.

Second, a cyclo-down converter 64 utilizes the modulated high frequency oscillations by ascribing the appropriate polarity to each pulse and thus forming a train of high frequency pulses with appropriate polarity and with a low frequency harmonic content as determined by the power system's electronic power control system which is shown and explained with reference to the following figures. The just described process of cyclo-down conversion is well known by the term cyclo-converter to those skilled in the art. Newly introduced is (1) the concept of a cyclo-up converter, as described above, with (2) concurrent application of a pulse modulation process in the therewith associated high frequency link so that demodulation of the resulting carrier by the cyclo-down converter 64 would lead to the pulse train $i_2$ which contains the low frequency components of the desired system output current $i_0$.

The high frequency filter 65 has a lower cut off frequency which is lower than the lowest harmonic component of the high frequency content of the current $i_2$ referred to above which emerges from the cyclo-down converter 64. The output current $i_0$ which enters the load 66 is thus a smoothed version of current $i_2$, as well known in the art of radio engineering.

The system shown in FIG. 1 is bilateral in the sense that a generator 66 instead of a load can be connected to the former output terminals of the power system. The process associated with the forward flow of energy, as described above, is now reversed. The former output filter 65 becomes the input filter; the former cyclo-down converter 64 becomes a cyclo-up converter; the former cyclo-up converter 63, a cyclo-down converter; the polyphase a.c.-h.f. filter 62 is then the systems output filter; and the former polyphase a.c. generator 61 becomes the system's load.

Voltages $e_{ac}$ and the therewith associated currents assume the respective instantaneous polarities which are characteristic for any of the conditions of power transfer, as viewed in the v-i plane and as is well known in the art: The individual phase voltages and phase currents $e_h$ and $i_h$ are concurrently in the first quadrant of this plane for forward energy flow from generator 61 to load 66; index $h = 1, 2, 3, \ldots$ indicates the ascribed order number for "reverse" flow of energy through the system from generator 66 to load 61 of the respective phases of voltage source $e_{ac}$ voltage $e_h$ and current $i_h$ occur concurrently in the third quadrant of the above-referred to v-i plane; $e_h$ and $i_h$ are currently in the second or fourth quadrant of the above cited v-i plane if the power transfer in either direction is associated with reactive power with leading or lagging voltage-current phase angle, as well known to those skilled in the art.

Converter operation was discusses with reference to a three phase supply line. The invention is, of course, not restricted to three phase feeder lines and can be used with any polyphase a.c. supply line.

One significant embodiment of the invention is illustrated in FIG. 2 and is now further discussed with reference to that figure. The functional blocks 61 through 66 cited in the explanation of the system with reference to FIG. 1 above are identified by numbers and enclosing broken lines. Further subdivisions and internal structures of the functional blocks referred to above, are indicated in FIG. 2.

The h.f. input filter 62 is here shown in form of "line" capacitors C11, C12, and C13, respectively, for purpose of simplicity. These capacitors should suffice for most cases in question when smoothing current pulses with "repetition rates" in the order of 10 kHz. However, the structure of filter 62 is, certainly, not restricted to the one shown, but can assume any appropriate form as known to those skilled in the art. The cyclo-up converter 63 consists of an antiparallel thyristor bridge consisting of thyristors CR$ij$ ($i = 1, 2, 3; j = 1, 2, 3, 4$) in any combination of $i$ and $j$, as well known to those skilled in the art. Index $i$ is extended beyond $i = 3$ for a polyphase system consisting of more than 3 phases and can be restricted to two phases. However, the output terminals 121 and 122 of said thyristor bridge with thyristor pairs CR$ij$ identified as complements 6311-3 and 6312-4; 6321-3 and 6322-4; 6331-3 and 6331-4, are not connected to a low pass filter or to a load as commonly known to those skilled in the art. Said terminals 121 and 122 are connected to a series resonant circuit consisting of capacitor $C_1$ and inductor L which are part of said cyclo-up converter 63. The output terminals 123 and 124 of said cyclo-up converter 63 are connected to the likewise numbered input terminals 123 and 124 of the cyclo-down converter. This cyclo-down converter 64 is here shown consisting of thyristor bridges CR5$j$ ($j = 1, 2, 3, 4$ for forward conduction of the filtered current $i_1$ through the load $Z_L$ so that the filtered load voltage $v_o > 0$ at the cathode of CR51). The same converter 64 consists also of thyristor CR6$j$ ($j = 1, 2, 3, 4$ for reverse conduction of the filtered current $i_1$ through $Z_L$ analogous to its forward conduction just described above; in this case is the load voltage $v_o > 0$ at the cathode of thyristor CR62). The thyristor bridges in the cyclo-up converter 63 and the cyclo-down converter 64 can be considered a first and a second set of controllable switch means for providing supply and return current flow between a first and a second power system such as 61 and 66. The first and second set of switch means is capable of connecting any of the connectors of 61 to any of the connectors of 66 through $C_1$ and L and simultaneously connecting any of the connectors of 61 to any of the connectors of 66 in parallel with $C_1$ and $L_1$. In the example shown in FIG. 2, the parallel connector is shown through current sensor 1, but it should be understood that this could be a direct connection.

The cyclo-down converter 64 defined above transforms the resonant current $i_1$ into a current $i_2$ by an appropriate choice of the thyristor pairs within 64 for each current pulse of $i_1$. The effect of this demodulation process was discussed with reference to FIG. 1 above.

Capacitor $C_o$ serves as an output filter and removes the high frequency content of $i_2$. A filtered current $i_o$ thus enters the load $Z_L$ identified as 66.

For the purpose of the introduction of the principles of operation of the system as a whole, it is first assumed that the voltage difference $e_1 - e_2$ is near its maximum and that the output volatge $v_o$ is meant to be nearly a constant d.c. voltage. It is, furthermore, assumed that the system has attained steady state conditions of operation.

The functional principles of the control system which controls current $i_1$ in a d.c. to d.c. converter, and therewith the power converter as a whole, is described in detail in the second cited reference. The essential functions of this control process are described with reference to FIGS. 4 and 5. The innovation presented here is the utilization of the above cited basic d.c. to d.c. converter as one functional block which is directly engergized by a full wave thyristor bridge contained in the cyclo-up converter 63.

The control system for the power circuit, so far described with reference to FIG. 2, is shown as one functional block 50. This control system is shown as consisting of two discrete and interconnected subdivisions, namely, the power control system 21 and the thyristor gating and firing system 30. Each of these two subsystems serves a distinct functional purpose. System 21 provides control for the appropriate transfer of power. System 30, provides the internal mechanisms needed for proper operation of the converter. The power control system 21 determines if and at what point in time the next current pulse of $i_1$ should be initiated in order that $v_o$ be at a prescribed level at that time and within given tolerances. The thyristor gating and firing system 30 (1) selects the "appropriate" thyristor pair in block 63 to generate the next current pulse of $i_1$ (this qualification, "appropriate," will become clear through further explanation throughout these specifications); (2) establishes unequivocally, that the a.c. supply line will not be short circuited by the firing of the "appropriate" thyristor pair, as referred to above, (3) selects the appropriate thyristor pair in block 64 for the prescribed polarity of $v_o$ at that time and consistent with the selected thyristor pair of block 63, and (4) emits firing pulses to the four thyristors selected under (1) and (3) above after ascertaining satisfaction of the conditions described under (2).

The power control system 21 admits the signal emitted by the current sensor 1 and the attenuated output voltage signal $k_o v_o$ emitted by the output voltage attenuator 40. The power control system has, furthermore, the input $ca_{rv}$ for setting the system output voltage level and $ca_o$ for setting the level of current through load $Z_L$. The thyristor gating and firing system 30 admits in recurrent and alternating succession commands CS1 through connection 107 and CS2 through connection 108, respectively, in order to fire thyristor pairs referred to above under (1) and (3). Block 30 also admits the line voltage signals $e_1$, $e_2$, and $e_3$; it admits, furthermore, a signal $$e_p = \begin{cases} 1 \text{ for } v_o > 0 \\ -1 \, v_o < 0 \end{cases}$$

which determines the selection of the thyristor pair referred to above under (3) in conjunction with the selection of the thyristor pair referred to above under (1) for each pulse of $i_1$.

The output voltage attenuator 40 admits the signals on both terminals of the load $Z_L$ via attenuator 42 which reduces the admitted signal by a factor $k_{02}$ and attenuator 43 which reduces the admitted signal by a factor $k_2$, respectively. The difference of the attenuated signals $k_o v_o$ is formed by the differential amplifier 44, provided $k_{01} = k_{02}$; the voltage $v_o$ of the floating load is, thus, sensed, reduced in magnitude and referred to the reference node of the power control system.

The significance of the signals, the functional blocks and of the power circuits, as explained with reference to FIG. 2, and their interaction will unfold with the explanations made with reference to FIGS. 1 and 4 through 10.

The preferred embodiment of the invention is presented in the FIG. 3 in the form of the schematic of the power circuits with indication of the converter control system in form of a block diagram.

The power circuits in FIG. 3 are derived from the power circuits of FIG. 2 by introduction of an ohmic isolation between the cyclo-up converter 63 and the cyclo-down converter 64 and by establishing an electromagnetic linkage between these two converters through transformer 2 which is indicated by the symbol XF. The cyclo-up converter 63 is referred to as the primary circuit, and the cyclo-down converter 64 is referred to as the secondary circuit, even though the cyclo-converters reverse their roles if the source of electric energy, the generator 61 and the load 66 interchange their functions as explained with reference to FIG. 1. Each of the series resonant components L and C of FIG. 2 is divided into two parts, of which one part $L_1$ and $C_1$ is in the primary circuit and of which a second part $L_2$ and $C_2$ is in the secondary circuit, as referred to above. The primary circuit includes also the primary winding $W_1$ of transformer XF comprising $N_1$ turns and the secondary winding $W_2$ of the same transformer XF comprising $N_2$ turns. The turns ratio $$a = N_2/N_1 \tag{1}$$

The total series capacitance C, referred to as the primary circuit, is then given by $$C = C_1/2 \tag{2}$$

The total series inductance L, referred to as the primary circuit is given by $$L = 2L_1 \tag{3}$$

The resonant half period $$T_o = \pi\sqrt{LC} = \pi\sqrt{L_1 C_1} \tag{4}$$

The resonant admittance is given by $$\sqrt{C/L} = \tfrac{1}{2}\sqrt{C_1/L_1} \tag{5}$$

Relations (2) through (5) are true if $$L_2 = a^2 L_1 \text{ and } C_2 = C_1/a^2 \qquad (6)$$

The above indicated division of the series inductance and of the series capacitance between the cyclo-converters and 63 and 64 is arbitrary. Satisfaction of relation (6) entails equal stresses on components caused by v-i products in both cyclo-converters. The power circuits described with reference to FIG. 3 have exactly the same characteristics as those explained with reference to FIG. 2, when viewed from the antiparallel thyristor bridge in block 63. However, the power circuits in FIG. 3 have at least two added characteristics over those of FIG. 2. First, the galvanic isolation between the primary and the secondary circuit allows to tie one terminal of the load $Z_L$ to be tied to an arbitrarily chosen reference node, usually, but not necessarily, ground; second, the output voltage level can be arbitrarily chosen.

The converter control system 50 is identical with the one described with reference to FIG. 2. Current sensor 1 has, also, the same function as previously described. The attenuator 40 performs the same function of providing the attenuated output voltage $a_o v_o$ to block 50 as previously explained. The system described with reference to FIG. 3 can process electric energy emanating from a two terminal generator in block 66 to a polyphase a.c. or to a d.c. system 61 as described with reference to FIG. 1. This system can operate in all four quadrants of the v-i plane.

Figure 4:
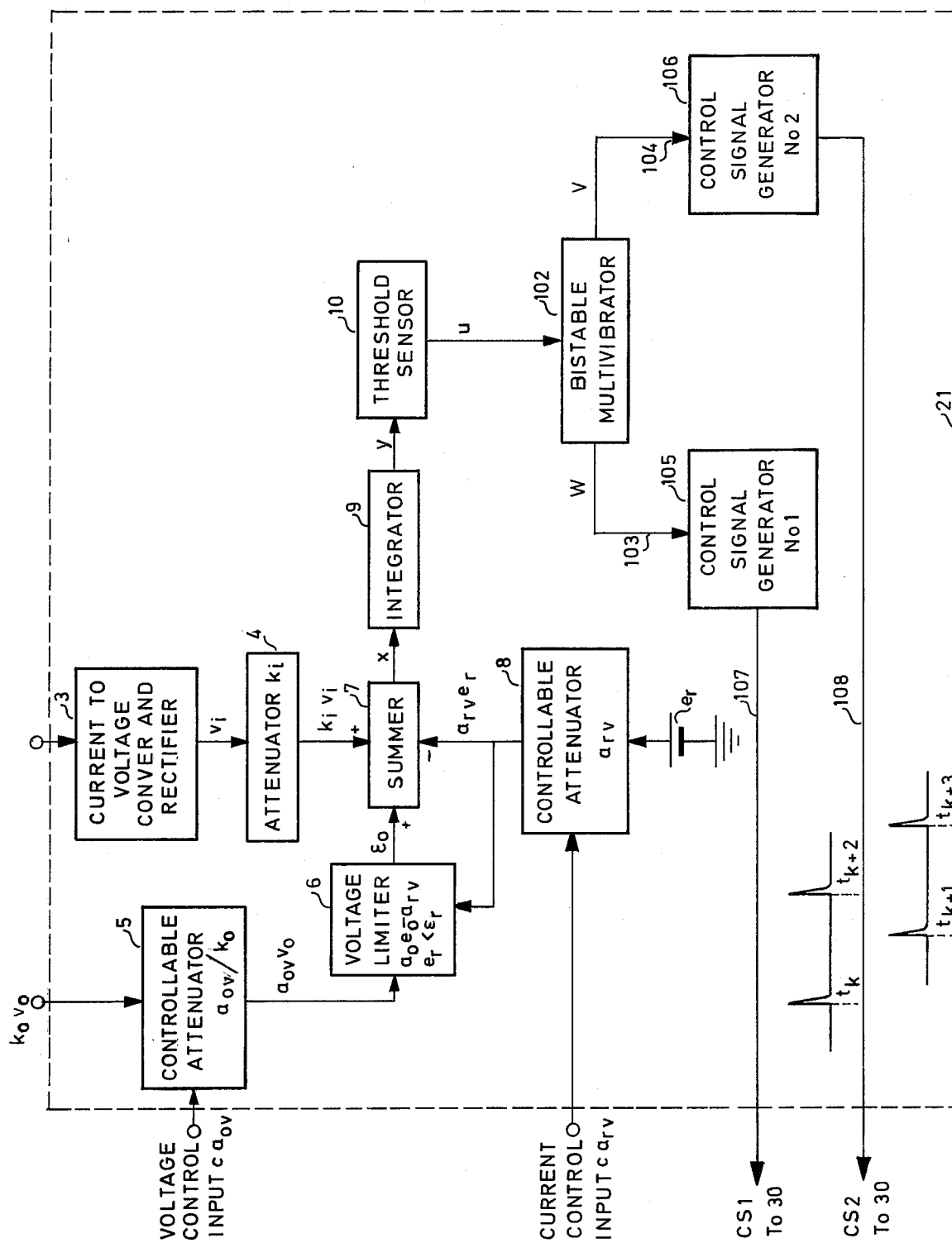
FIG. 4 is the block diagram of the power control system which governs output voltage and output current control, respectively and provides firing signals to groups of thyristors, as determined by another part of the converter control system.

The power control system 21 is shown in block diagram form in FIG. 4. The function of this control system is described in conjunction with the operation of the power circuits shown in FIG. 2. For simplicity of explanation it is at first assumed that a source of d.c. power is connected to the terminals of block 61 marked with $e_1$ and $e_2$, respectively, with $e_2 > e_1$ and that thyristors CR51, CR52, CR53, and CR54 are permanently energized and thus possess the characteristics of diodes. The aforesaid assumption is removed later in the description of the invention, once the basic functional principles have been explained.

Explanation of the power control system 21 is supported by the critical voltage and current waveforms shown in FIGS. 5(a) through (p).

The voltage $v_c$ on capacitor C is shown as $v_c(t_k)$ on FIG. 5(p) at the point in time just before $t = t_k$. For the time being $e_s$ is considered to be a constant as stated before. The input voltage $e_s$ of the power system is, in general, $$e_s = e_i - e_j$$
$$i = 1, 2, 3,$$
$$j \begin{cases} = 1, 2, 3, \\ \neq i \end{cases} \qquad (7)$$

At time $t \lesssim t_k$, a current $i_1$ shown in FIG. 5(a) is flowing in the resonant circuit consisting of capacitor C inductor L, block 64 and the thyristors CR14, CR21, CR51 and CR54. The current in the last named thyristors is shown as current $i_{CR14}$ in FIG. 5(b). The bistable multivibrator 102 changes state upon receipt of a signal $u$ shown in FIG. 5(k) from threshold sensor 10. Origin of that signal $u$ will emerge further on from the description of the power control system 21 as a whole.

It is assumed that the bistable multivibrator 102 emits via connection 103 at $t = t_k$ a signal $w$ shown in FIG. 5(l). The leading edge of $w$ causes emission of signal CS1 by the control signal generator No. 1 identified by number 105. This signal CS1 is carried by connection 107 and indicated in FIG. 5(n).

The thyristor gating and firing system 30 is, at this time, programmed to convert all signals CS1 emanating from the power control system 21 to firing signals for thyristors CR11 and CR24. The casual relationship of these events will become clear in the course of this description.

Thyristors CR11 and CR24 close in response to the above described trigger signal CS1. Current $i_1$ is not transferred from thyristors CR14 and CR21 to thyristors CR11 and CR24. Thyristors CR51 and CR54 continue to conduct current $i_1$ which continues flowing in the same direction as just prior to $t < t_k$; this is illustrated in FIGS. 5(b) and (c). A new portion of $i_1$ is thus generated; an initial potential $$v_L(t_k) = e_1 - e_1 - v_c(t_k) - v_{xa} \qquad (8)$$

is imposed on inductor L where $$|v_{xa}| = v_o$$

$v_o =$ the d.c. output voltage of the system
$v_c =$ the voltage on capacitor C and is opposed to the direction of current $i_1$ as indicated in FIG. 2

It is, furthermore, assumed that $$C_o >> C \qquad (9)$$

The resonant current $i_1$ runs its course during the time interval $T_{fk}$ for $t_k < t < t_k + T_{fk}$. The capacitor voltage $v_c$ defined above and illustrated in FIG. 5(p) continues to rise until the end of the resonant interval $T_{fk}$ when $v_c = v_{c\,max}$ at $t = t_k + T_{fk}$. Current $i_1(t_k + T_{fk}) = 0$ and thyristors CR11 and CR24 open for lack of holding current. Capacitor C now discharges into the source of electric energy with voltage $e_1 - e_2$ and through the resonant path L, $C_1$ and thyristors CR13, CR22, CR52 and CR53.

The last two named thristors CR52 and CR53 are still assumed to be permanently energized or provided with a permanent trigger signal. Thyristors CR13 and CR22 are energized by the thyristor gating and firing system 30 based on other information in addition to the preceding signal CS1, as will be explained in the description of FIGS. 10 and 11.

The current $i_1$ which flows in the just indicated path during the time interval $T_{fk}$ for $t_k + T_{fk} < t < t_{k+1}$ is indicated as $i_{CR13}$ in FIG. 5(d).

The bistable multivibrator 102 changes state at time $t = t_{k+1}$ in response to signal $u$, illustrated in FIG. 5(k) which emanates from threshold sensor 10. The leading edge of signal v, emitted by the bistable multivibrator 102 through its output 104, causes generation of a trigger pulse by the control signal generator No. 2, identified by number 106; this trigger signal CS2 is illustrated in FIG. 5(o) and is conveyed to the thyristor gating and firing system 30 via connection 108.

Thyristors CR12 and CR23 close in response to the above described trigger signal CS2 at time $t = t_{k+1}$. Current $i_1$ is now transferred from thyristors CR13 and CR22 to thyristors CR12 and CR23; thyristors CR52 and CR53 remain conducting current $i_1$ which continues flowing now in the same direction as during the interval $T_{fk}$. FIG. 5(e) illustrates current $i_1$, here designated as $i$ CR14 for the interval just described.

If resonant current $i_1 = 0$ at $t = t_{k+1} + T_{fk+1}$, and thyristors CR12 and CR23 open for lack of holding current. Thyristors CR14 CR21 are now energized by the thyristor gating and firing system 30 in the manner described before for the firing of thyristors CR13 and CR22. Capacitor C discharges now through the resonant LC circuit, the load 66, its filter 65 and thyristors CR14, CR21, CR51 and CR54. The current $i_1$ follows the just described path until $t = t_{k+2}$ when a new signal CS1 is emitted by the power control system 21 and thyristors CR11 and CR12 are fired again.

Current $i_1$ is shown as a continuous function of time in FIG. 5(a); the therewith associated voltage $v_c$ over capacitor C is shown in FIG. 5(p). The initial voltage $v_L$ over inductor L at time $t = t_k + T_{fk}$ is given by $$-v_L(t_k + T_{fk}) = v_c(t_k + T_{fk}) - (e_1 - e_2) - v_{xa} \quad (10)$$

Analysis and the results presented in FIGS. 5(a) and 5(p) show that $$|v_L(t_k + T_{fk})| < |v_L(t_k)| \quad (11)$$

Inequality (11) results from the fact that $v_c(t_k)$ is a negative quantity as seen from FIG. 5(p) and thus adds to the source voltage $e_1 - e_2$ in (8), but $v_c(t_k + T_{fk})$ is a positive quantity which is reduced by the source voltage $e_1 - e_2$ in equation (10). It follows that $$I_{1fk} > I_{1rk} \quad (12)$$

where
- $I_{1fk}$ = the amplitude of the resonant current $i_1$ for $t_k < t < t_k + T_{fk}$;
- $I_{1rk}$ = the amplitude of the function $i_1 = I_{1rk} \sin t/\sqrt{LC_1}$ for $t_k + T_{fk} < t < t_{k+1}$.

The same behavior of $i_1$ holds true for the following cycle of operation of the power circuit of the converter in the time interval $T_{ok+1} = t_{k+2} - t_{k+1}$, except that the directions of flow of current $i_1$ are reversed with respect to the directions of flow of current $i_1$ for the corresponding increments of time in the interval $T_{ok} = t_{k+1} - t_k$.

The primary cause of the continued flow of current $i_1$ is rooted in the fact that $v_L(t_k) > 0$ in equation (8) and that $|v_L(t_k + T_{fk})| > 0$ in (10). The same holds true for all following cycles $T_{ok}$ whose index k is characterized by a monotonically increasing succession of integers. A more comprehensive explanation of the process of transfer and control of electric energy through resonant circuits is contained in references, named above. Current $i_1$ is sensed by current sensor 1 shown in FIG. 2. The signal emitted by this sensor is a replica of $i_1$ and is fed into the current to voltage converter and rectifier 3 shown in FIG. 4. The output $v_1$ of named block 3 is attenuated to $k_i v_i$ by attenuator $k_i$, identified by number 4. Signal $k_i v_i$ is a rectified and attenuated replica of current $i_1$; this signal $k_i v_i$ is illustrated in FIG. 5(f). The signal of a reference source $e_r$ is attenuated to the level $a_{rv} e_r$ by attenuator 8; both shown in FIG. 4. Summer 7 adds algebraically the just named signals $k_i v_i$ and $a_{rv} e_r$. The third input to summer 7 consisting of signal $\epsilon_o$ is, at first, considered to be zero. The summ $$x = k_i v_i - a_{rv} e_r \quad (13)$$

shown in FIG. 5(h) is fed into the integrator 9 which emits signal $$y = y(t_k) + \int_{t_k}^{t} (k_i v_i - a_{rv} e_r) dt \quad (14)$$

shown in FIG. 5(i). Signal $y$ is fed into threshold sensor 10 which emits the signal $u$ shown in FIG. 5(k). This signal $u$ rises sharply whenever signal $$y = v_T \quad (15)$$

where $v_T$ is the threshold level of sensor 10. It was explained above that the control signal generators No. 1 and No. 2 emit in recurrent sequence signals CS1 and CS2, respectively, whenever signal $u$ triggers the bistable multivibrator 102. Each of these signals CS1 and CS2 causes firing of controlled rectifiers, as described before and thus initials new cycles of operation. The system has the characteristics of a current source for the following reasons. Signal $y$, given by equation (10) cannot exceed $v_T$ because threshold sensor 10 causes initiation of a new cycle of $i_1$ at the instant that $y = v_T$; this instant then becomes the point in time $t = t_{k+1}$. This means that (14) can be rewritten in the form $$y(t_{k+1}) = y(t_k) + \int_{t_k}^{t_{k+1}} (k_i v_i - a_{rv} e_r) dt \quad (16)$$

Yet, relation (15) makes it necessary that $$y(t_{k+1}) = y(t_k) = v_T \quad (17)$$

It follows from Eqs. (16) and (17) that $$\int_{t_k}^{t_{k+1}} v_i dt = \frac{a_{rv} e_r T_{ok}}{k_i} \quad (18)$$

or that $$\frac{1}{T_{ok}} \int_{t_k}^{t_{k+1}} |i_1| dt = \frac{e_r a_{rv}}{k_i} = i_{1av}(k) \quad (19)$$

where
$i_{1av}(k)$ = the average of the absolute value of current $i_1$ in the $k$th cycle of the converter operation,
since $$v_i = |i_1| \quad (20)$$

as defined before.

The average of $|i_1|$ over each closed cycle of operation of the converter $T_{ok}$ is, therefore, determined by the term $e_r a_{rv}/k_i$ which can be arbitrarily controlled within the design limits of the converter system. Attenuator 8 can be controlled by an external current control input $ca_{rv}$ as shown in FIG. 4. This control input alters the attenuation $rv$ and therewith $i_{1av}$ as defined under (19). For constant $a_{rv}$ is $$i_{1av}(k) = i_{1av}(k+1) = i_{1av} \quad (21)$$

and $$i_{1av} = i_{2av} = i_o \quad (22)$$

where $i_o$ = the current in load 66.

Continuing with the explanation of FIG. 4; The output of the converter is a constant d.c. current when the conditions defined in relations (16) through (21) prevail.

The output signal $k_o v_o$ of the output voltage attenuator 40 is further attenuated by the controllable attenuator 5. The output $a_o v_o$ of block 5 enters the voltage limiter 6, which also admits the signal $a_r e_r$ coming from block 8 whose function was explained before. The voltage limiter 6 forms the difference.

$$\epsilon_o = a_o v_o - a_r e_r \qquad (23)$$

This difference signal $\epsilon_o$ is added to summer 7 and causes a reduction of $i_{1av}(k)$ as defined in (19) for $v_o > V_o$, with $V_o$ being defined as the nominal value of the output voltage $v_o$.

Conversely, signal $\epsilon_o$ causes an increase of $i_{1av}(k)$ for $v_o < V$. Corrective measures are thus being taken whenever $v_o$ deviates from its nominal value $V_o$.

This process of negative voltage feedback which is described above is well known in the art and used for the purpose of output voltage stabilization. Amplification of the difference $v_o V_o - a_r e_r$ within block 6, if appropriate, is also presumed as a matter of course, as well known in the art.

Voltage limiter 6 is, furthermore, so devised that its output signal $\epsilon_o$ cannot be smaller than a prescribed lower limit $\epsilon_r$. The just described function of the voltage limiter 6 can be implemented by the use of electronic output voltage limited difference amplifiers, as well known by those skilled in the art. The limitation of signal $\epsilon_o$ to a minimum value $\epsilon_r$ prevents the generation of excessive currents $i_1$ when conditions of overload or of short circuited output terminals of the converter prevail; this also applies for dynamic transient conditions, including those for start of system operation.

Control of the preferred embodiment of FIG. 3 is attained in exactly the same manner as explained with reference to the system depicted in FIG. 2 with appropriate interpretation of the impedance transformation of the secondary power circuit of FIG. 3 to its primary power circuit.

The, so far, self imposed restriction that $e_1 - e_2$ be a constant is now removed. The output voltages $e_1$, $e_2$ and $e_3$ of the polyphase a.c. generator 61 in FIG. 1 are now applied to the thyristor bridge of the cylco-up converter 63 shown in FIG. 2. The thyristor gating process needed for operation of the power converter under these conditions is first explained with reference to FIG. 6.

FIG. 6(a) shows the voltage $e_1$, $e_2$, and $e_3$ of a conventional three phase a.c. system for purpose of explanation of the invention. Two of the three phases of the a.c. system to power the series resonant circuit in the cycloup converter are chosen for the largest potential difference between these phases, compared to the other two possibilities between three variables. For purpose of explanation, it is assumed at this time that the frequency $f_{sn}$ of the individual phases of the three phase system is $$f_{sn} = \tfrac{1}{3}\pi \qquad (24)$$

and that $t = 0$ when $e_1 = e_3$ for $de_1/dt > 0$. The largest potential difference in the time interval $0 < t < \pi/3$ is found between $e_1$ and $e_2$, with $e_1 > e_2$. Phases 1 and 2 are, therefore, used in the above identified time interval.

Figure 6:
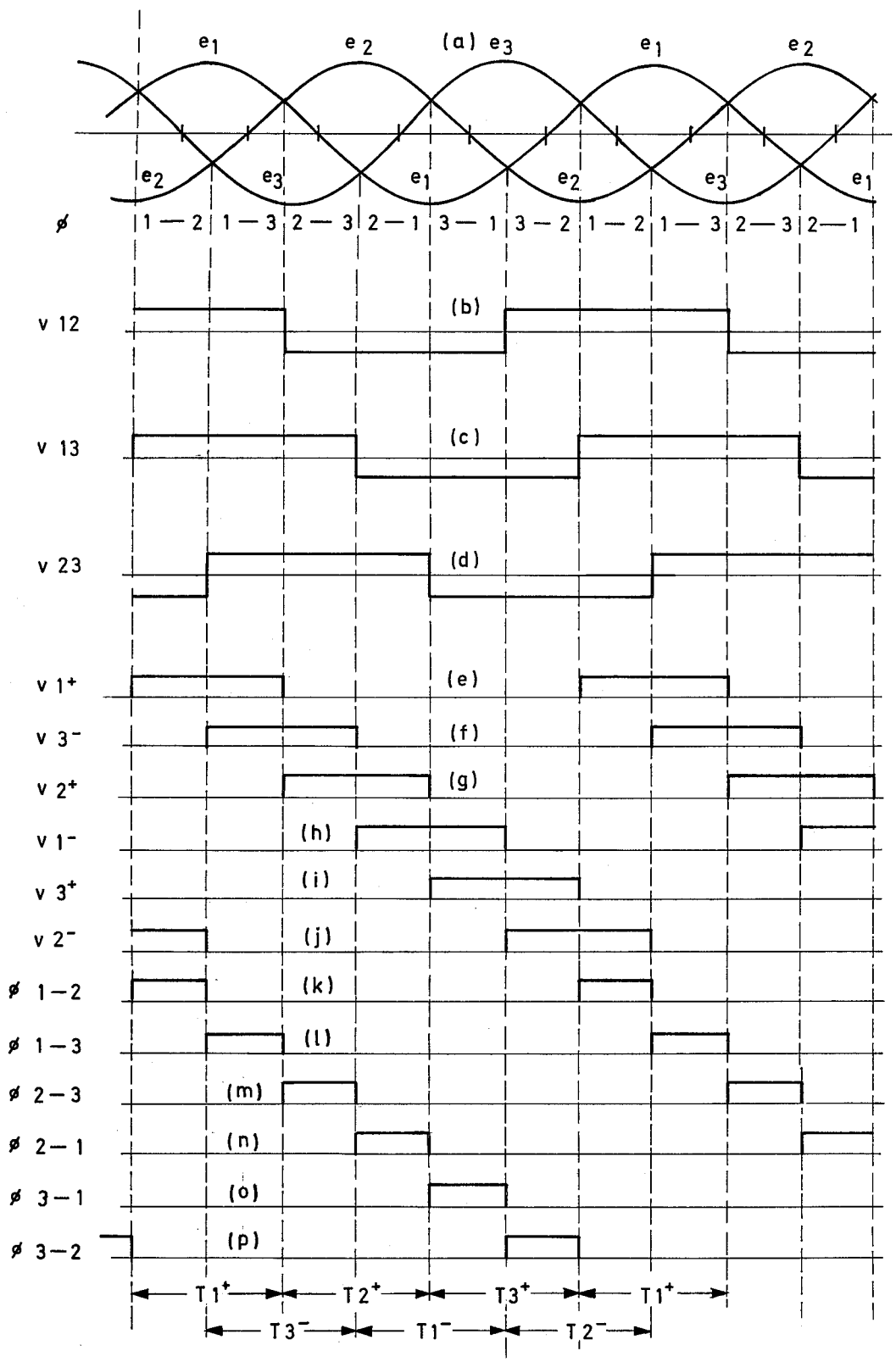
FIGS. 6(a) through 6(j) show critical logic signals as related to the supply voltage and as needed for selection of the appropriate thyristors and, thus, for gating of the signals emanating from the power control system.
FIGS. 6(k) through (p) identify the a.c. phase pairs needed for converter operation as a function of the supply voltages.

This use of phases $\phi$ is indicated by the symbol 1-2 in FIG. 6(a). The largest potential difference in the time interval $\pi/3 < t < 2\pi/3$ is found between $e_1$ and $e_3$ with $e_1 > e_3$. The use of phases $\phi$ is indicated by the symbol 1-3 in FIG. 6 (a). Thus the phase $\phi$ symbol $i$-$j$ indicates use of phases $i$ and $j$, when $e_i > e_j$, with $i = 1, 2, 3$ and $j = 1,2,3$, but $j \neq i$. The corresponding phase symbols are further indicated in FIG. 6(a).

Figures 7, 7A:
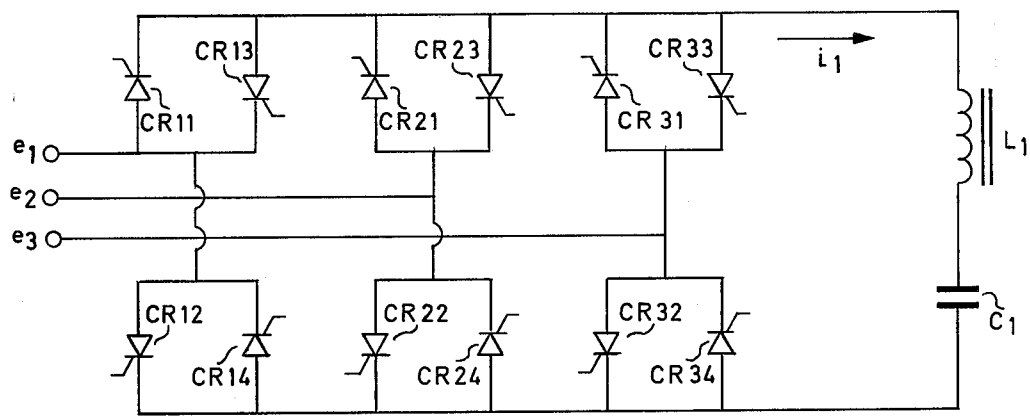
FIGS. 7 and 7A is a schematic of the power circuit shown in FIG. 2 with shorted cyclo-down converter terminals for identification of required thyristor pairs as a function of source voltages with the therefrom derived table of identification of thyristors.

Engagement of thyristor pairs as required by the principles established with reference to FIG. 6(a) is explained with reference to FIG. 7. This FIG. 7 shows the schematic of the cylco-up converter 63 with short circuited output terminals 123 and 124 of simplicity of explanation of current flow $i_1$.

The firing sequence of thyristors CR11 through CR14 and CR21 through CR24 was explained with reference to FIGS. 2, 4 and 5 for the case that $e_1 - e_2$ were a constant. The same firing sequence holds for the use of phases 1 and 2 characterized by the symbol 1-2 defined above, even if $e_1 - e_2$ is not a constant. The firing sequence for the operating phase 1-2 is given in the first column of the table shown in FIG. 7. The symbol FWD, meaning forward, is used if the supply line delivers power to the LC circuit. Conversely, the symbol REV, meaning reverse, is used if the LC circuit delivers power to the supply line. Comparison of the condition of engaged operating phases 1-2, with the above cited explanation for the case that $e_1 - e_2$ is constant, yields an exact summary of the firing sequence of thyristors in the cited explanation with the first column of said table in FIG. 7.

The thyristors of the cyclo-down converter 64 are, at this time, not included in the explanation for clarity of presentation. It is assumed that the thyristor gating and firing system, which will be explained further on, provides the trigger pulses to the thyristors identified in the columns of the table in FIG. 7; each of these columns is headed by the symbol $i$-$j$ explained above which identifies the phases engaged in the converter during the respective magnitude of phase voltages $e_i > e_j$ and for the time intervals as explained above. The eight thyristors identified in each of the appropriate columns headed by $e_i > e_j$ and by $i$-$j$ defined and explained above, perform, in each of the time intervals of duration $\pi/3$, exactly the same function as the thyristors identified in the first column for $e_1 > e_2$ associated with the operating phases 1-2 and explained above.

If $e_2 > e_1$ and the operating phases are characterized by the symbol 2-1, then the thyristors engaged in the conduction of the resonant current $i_1$ are exactly the same as for the case with symbol 1-2 explained previously. However, the roles of the thyristor pairs have been interchanged. The direction of conduction of current $i_1$ cannot be altered and remains the same. But the designation of FWD and REV is reversed in each case, because of the interchanged polarities of $e_2 > e_1$ from the previous $e_1 > e_2$. The same holds true for all other conditions of operating phases $i$-$j$ as defined above.

Figure 9:
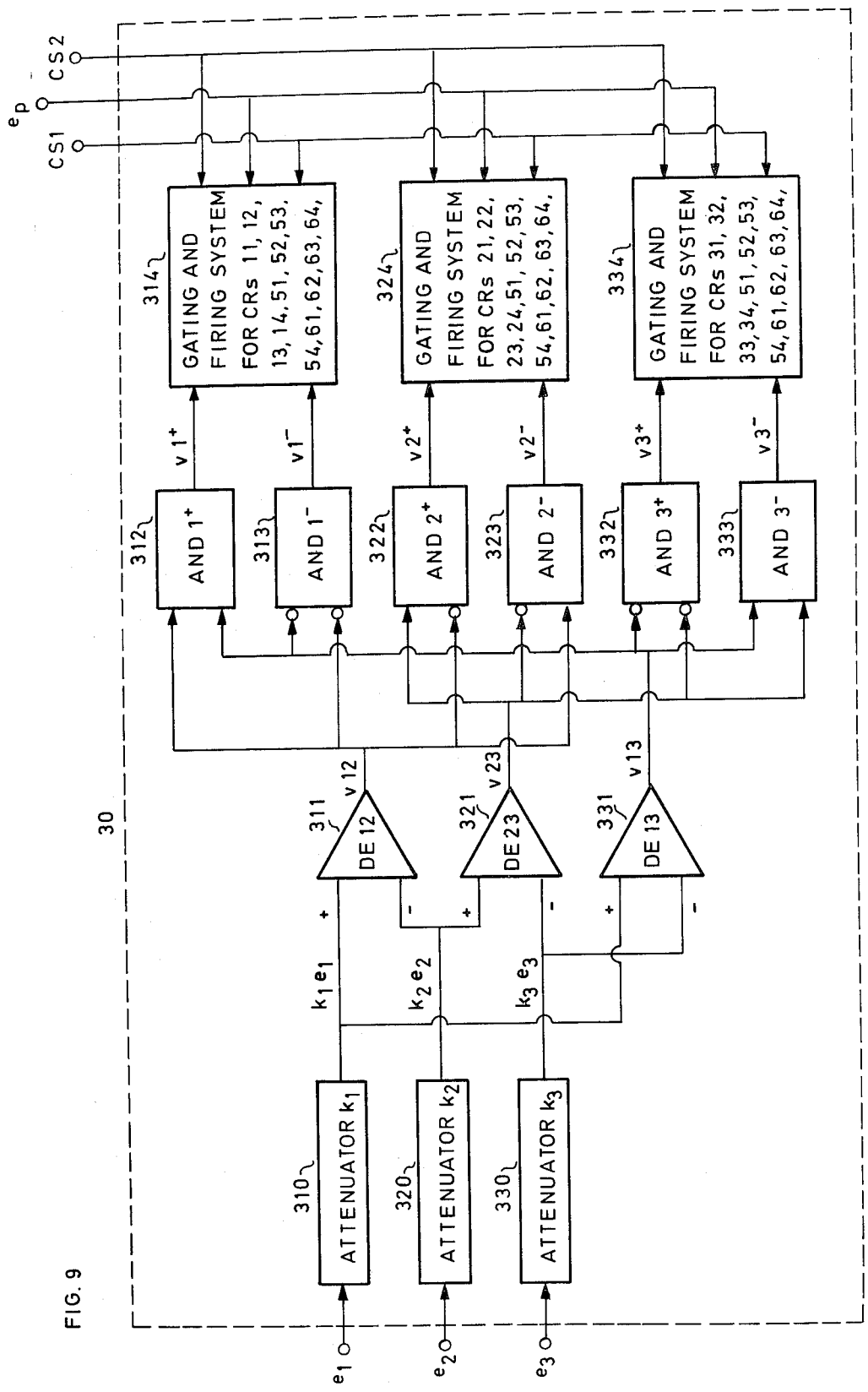
FIG. 9 is the block diagram of the thyristor gating and firing system used to implement the requirements of the material presented in FIGS. 6 through 8 and to govern the thyristors in the cyclo-down converter identified in FIGS. 1 through 3.

Operation of the converter is further explained with reference to the table in FIG. 8 and the block diagram of FIG. 9. FIG. 9 shows the block diagram of the thyristor gating and firing system 30, first introduced with the explanation of FIG. 2.

The three phase voltages $e_1$, $e_2$, and $e_3$ enter the system, and each of these voltages is reduced by an attenuator. Thus, signal $e_1$ is reduced by attenuator 310 to $k_1 e_1$, signal $e_2$ is reduced by attenuator 320 to $k_2 e_2$, and signal $e_3$ is reduced by attentuator 330 to $k_3e_3$. It is assumed that all signals $e_i$ are being attentuated by the same constant $k_i$, when $i = 1, 2, 3$. The just named attentuated signals are fed, selectively, in pairs into three electronic voltage discriminators which are described now. The output $v12$ of the voltage discriminator DE12 with number 311 is positive for $k_1e_1 > k_2e_2$ and negative for $k_1e_1 < k_2e_2$. Discriminator DE23 with number 321 forms the difference $k_2e_2 - k_3e_3$. If $k_2e_2 > k_3e_3$, then the output $v23$ of discriminator DE23 is positive, but if $k_2e_2 < k_3e_3$, then $v23$ is negative. Finally, discriminator DE13 with number 331 compares $k_1e_1$ to $k_3e_3$. If $k_1e_1 > k_3e_3$, then the output $v13$ of DE13 is positive. If $k_1e_1 < k_3e_3$, then the output $v13$ of DE13 is negative. Voltages $v12$, $v23$, and $v13$ are illustrated in FIGS. 6(b) through 6(d). Their polarities are, readily, coordinated with the relative polarities of $e_1$, $e_2$ and $e_3$ in FIG. 6(a).

The just described output signals $v12$, $v23$ and $v13$ are fed into the AND circuits 312, 313, 322, 323, 332 and 333 also shown in FIG. 9. Circuit AND $1^+$ with number 312 emits a positive signal $v1^+$ only if both $v12 > 0$ and $v13 > 0$ concurrently; otherwise $v1^+$ is zero. Circuit AND $1^-$ with number 313 emits a positive signal $v1^-$ only if $v12 < 0$ and $v13 < 0$ concurrently; otherwise $v1^-$ is zero. Circuit AND $2^+$ with number 322 emits a positive signal $v2^+$ only if $v12 > 0$ and $v23 > 0$ concurrently; otherwise $v2^+$ is zero. Circuit AND $2^-$ with number 323 emits a positive signal $v2^-$ only if $v12 > 0$ and $v23 > 0$ concurrently; otherwise $v2^-$ is zero. Circuit AND $3^+$ with number 332 emits a positive signal $v3^+$ only if $v23 < 0$ and $v13 < 0$ concurrently; otherwise $v3^+$ is zero. Circuit AND $3^-$ with number 233 emits a positive signal $v3^-$ only if $v23 > 0$ and $v13 > 0$ concurrently; otherwise $v3^-$ is zero.

The just described signals are indicated in FIG. 6 as follows: $v1^{30}$ in FIG. 6(e); $v3^-$ in FIG. 6(f); $v2^+$ in FIG. 6(g); $v1^-$ in FIG. 6(h); $v3^+$ in FIG. 6(i); $v2^-$ in FIG. 6(j). Signals $v1^+$ and $v1^-$ are fed into block 314, which contains the gating and firing system for controlled rectifiers CR11, 12, 13, 14, 51, 52, 53, 54, 61, 62, 63 and 64. The system contained in block 314 receives either signals CS1 and CS2 in succession, explained with reference to FIGS. 2, 4 and 5; the same block also receives a signal $e_p$ which will be identified and explained further on.

The requisite conditions given in the table of FIG. 7 for firing the controlled rectifiers shown in block 63 are now summarized in the table of FIG. 8. These conditions are identified for forward conduction (FWD) as defined with reference to the table in FIG. 7 and with reference to the signals emitted by all pairs formed by the discriminators DA12, DA13 and DA23 and to the relative polarity of their outputs $v12$, $v13$ and $v23$, respectively, as illustrated in FIGS. 6(b) through 6(d) and as explained before.

The symbol $x$ indicates an affirmative coincidence of the output signals of pairs of discriminators for firing of a specific controlled rectifier. The symbol 0 indicates the alternative means of providing inhibiting signal by the same discriminator for that purpose. The left hand part of the table of FIG. 8 identifies the eligibility of controlled rectifiers for the forward (FWD) conduction of current. The right hand side of this table is discussed further on in connection with the explanation of blocks 314, 324, and 334 in FIG. 9.

Figure 10:
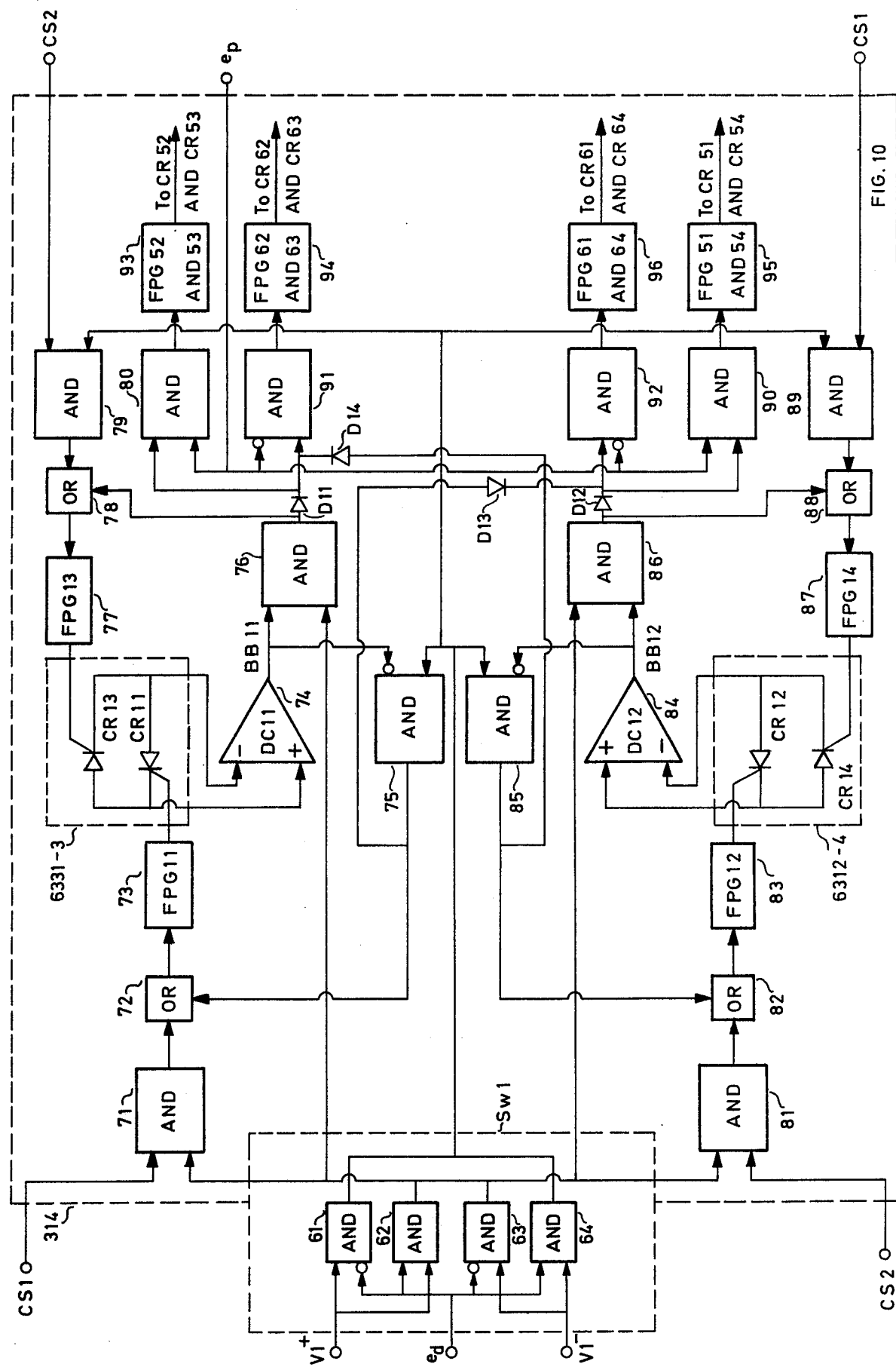
FIG. 10 is the detailed block diagram of one of three blocks of the same type used for the gating of the thyristors of the individual phases of the cyclo-up converter shown in FIG. 9.

The gating and firing system 314 is shown in block diagram form in FIG. 10. This system 314 is explained also with reference to the significant waveforms shown in FIG. 11. Block 314 contains the firing pulse generators for thyristors CR11 through CR14, CR51 through CR54, and CR61 through CR64; this block 314 also contains the logic to implement the thyristor firing sequence of thyristors CR11 through CR14 as determined by the table of FIG. 7 and as discussed with reference to FIGS. 2, 6 and 7.

The firing sequence for thyristors CR51 through CR54 as related to the firing sequence of thyristors CR11 through CR14, which was explained before with reference to FIGS. 2, 4 and 5 is now reitereated for clarity of presentation for the case $e_p = 1$ for which $v_o > 0$ and $v1^+ > 0$. Thyristor pair CR51 and CR54 is fired whenever one thyristor pair in block 63 which includes thyristor CR14 is fired. Thyristor pair CR52 and CR53 is fired whenever one thyristor pair in block 63 is fired which includes thyristor CR13. More generally, thyristor pair CR51 and CR54 is fired concurrently with all thyristors indicated in the table of FIG. 7 in the second row of the group identified for $i_1 > 0$. Thyristor pair CR52 and CR53 is fired concurrently with all thyristors indicated in the first row of the group identified for $i_1 < 0$ in the same table.

Conversely, for $e_p = -1$ for which $v_o < 0$, thyristor pair CR61 and CR64 is fired concurrently with the thyristors indicated in the same table of FIG. 7 in the second row of the group identified for $i_1 > 0$. Thyristor pair CR62 and CR63 is fired concurrently with the thyristors indicated in the same table in the first row of the group identified for $i_1 < 0$. The following explanation is, at first, restricted to the firing signals emitted by block 314, now under discussion.

Signal $v1^+$ is positive for $0 < t < 2\pi/3$, as explained before and illustrated in FIG. 6(e). Signal $v1^-$ is zero during the just named time interval. Both just named signals enter block SW1 which is a subdivision of block 314 shown in FIG. 10. Signals $v1^+$ and $v1^-$ are gated by block SW1 in a manner so that their role within the remainder of block 314 is interchanged, depending upon the polarity of a control signal $e_d$. Signal $v1^+$ is directed toward AND gates 71, 74, 81 and 84 when $e_d = 1$; likewise signal $v1^-$ is directed toward AND gates 75, 79, 85 and 89 when $e_d = 1$. However, signal $v1^-$ is directed toward AND gates 71, 74, 81 and 84 and signal $v1^+$ is directed toward AND gates 75, 79, 85 and 89 when $e_d = -1$. The control signal $e_d$ is an external or a feedback signal, as applicable. The further explanation will be first continued for the condition that $e_d = 1$.

The presence of signal $v1^+$ at the AND gate 71 allows passage of signal CS1 through that AND gate. The output signal of AND 71 energizes via OR gate 72 the firing pulse generator FPG11, identified by number 73. This FPG11, thus, fires thyristor CR11 whenever a signal CS1 coincides with signal $v1^+$ as illustrated in FIGS. 11(a), 11(d) and 11(j). Symbol $T1^+$ indicates the time interval in which the phase relation 1-2 prevails, as explained with reference to FIG. 6. Thyristor CR11 is one of two thyristors which close the series resonant circuit of the cylco-up converter 63 under the just described conditions. Closing of the companion thyristor associated with CR11, CR12, Cr13 and CR14 in block 63 will become evident further on with description of blocks 324 and 334.

The direction of portions of the current $i_1$, namely current $i_{CR14}$ and $i_{CR11}$ indicated in FIGS. 5(b) and 5(c), respectively, remains unaltered. Thyristor pair CR51 and CR54 is conducting the current $i_{CR14}$ as explained above for $e_p = 1$. Current $i_1$ is not interrupted during the transition from $i_{CR14}$ to $i_{CR11}$; no firing signal is, therefore, needed to continue conduction of the thyristor pair CR51 and CR54 at time $t = t_k$ when CR11 is fired as described above.

Figure 11:
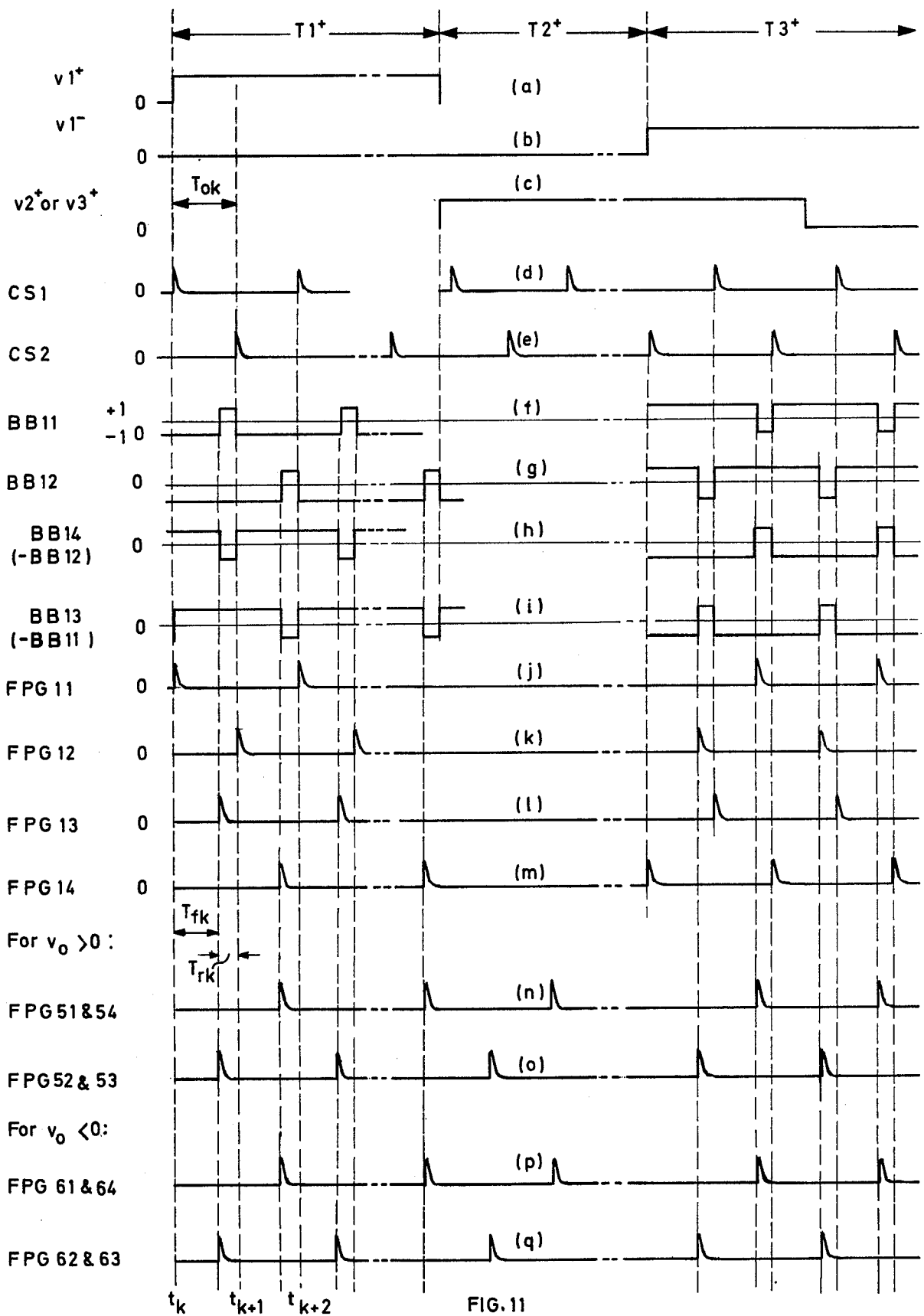
FIGS. 11(a) through (q) show critical signal waveforms in the detailed gating logic shown in FIG. 10, useful in the explanation of the invention.

Current $i_1 > 0$ subsides at time $t = t_k + T_{fk}$ as explained with reference to FIGS. 2, 4, and 5. Thyristor CR11 then opens for lack of a holding current and is immediately back biased because $v_c(t_k + T_{fk}) > e_1 - e_2$, as illustrated in FIG. 5(p). Discriminator DC11 with number 74 then emits a positive signal BB11 shown in FIG. 11(f), which energizes the AND gate 76 in the presence of signal $v1^+$. The output of AND 76 energizes, via diode D11, the OR gate 78 and the AND gate 80, still assuming that $e_p = 1$. Thyristor pair CR52 and CR53 is then fired by firing the pulse generator 93, named FPG 52 and 53; the therewith associated firing pulse is illustrated in FIG. 11(o). Thyristor CR13 is fired at the same time $t = t_k + T_{fk}$ via firing pulse generator 77, named FPG13, as illustrated in FIG. 11(1). Thyristor CR13 continues conducting current $i_{CR13}$ indicated in FIG. 5(d), until $t = t_{k+1}$, and firing signal CS2 explained with reference to FIGS. 2, 4 and 5 is emitted by the power control system 21.

Signal CS2 enters block 314 shown in FIG. 10 and energizes AND gate 81 in the presence of $v1^+$ which still prevails; its output signal enters, via OR gate 82, the firing pulse generator 83, named FPG12, which fires thyristor CR12 as illustrated in FIG. 11(k). Conduction of current $i_1$ is then transferred from CR13 to CR12 as indicated in FIGS. 5(d) and (e). Thyristor pair CR52 and CR53 continues to conduct current $i_1 < 0$ whose direction remains unaltered by the just described transfer of current $i_1$ to CR12. The resonant current $i_{CR12}$ shown in FIG. 5(e) runs its course until CR12 opens for lack of a holding current near $t = t_{k+1}$ and is back biased since $v_c(t_{k+1}) > e_1 - e_2$. The existence of the just described back bias condition of CR12 is sensed by discriminator DC12 which then emits signal BB12 shown in FIG. 11(g). Coincidence of signals BB12 with signal $e_p = 1$ energizes, the AND gate 86, which in turn energizes via diode D12, the OR gate 88 and the AND gate 90. The signal conveyed by OR 88 energizes the firing pulse generator 87, named PFG14, which then fires thyristor CR14 as indicated in FIG. 11(m). AND gate 90 energizes the firing pulse generator 95, named FPG51 AND 54 which emits a firing pulse to thyristors CR51 and CR54, as shown in FIG. 11(n). Current $i_1$ shown in FIG. 5(a) is now in its portion $i_{CR14}$ shown in FIG. 5(b) assumed to be present at the start of the explanation of the firing sequence caused by block 314, which repeats itself in the same way as just described for the continuous operation of the converter.

Reversing of the polarity of the system output voltage $v_o$ so that $v_o < 0$, as defined with the explanation with reference to FIG. 2, is caused by reversing the polarity of $e_p$ from $e_p = 1$ to $e_p = -1$, as explained before. AND gate 91 is then energizes in the presence of signal BB11 shown in FIG. 11(f) causing firing of thyristors CR61 and CR63, as shown in FIG. 11(g) instead of firing thyristors CR52 and CR53 described above. Thyristors CR61 and CR64 are, likewise fired via AND gate 92 and firing pulse generator 96, named FPG 61 and 64 as shown in FIG. 11(p), in the presence of signal BB12, shown in FIG. 11(g), instead of thyristors CR51 and CR54, as The forward conduction cycle FWD prevails for $t_k < t < t_{k+1}$ and the reverse conduction cycle REV prevails for $t_{k+1} < t < t_{k+2}$ in the case discussed above for the time interval T1+, identified in FIG. 6, when $e_1 > e_2$. If now $e_2 > e_1$ and $v1^+ = 0$, as shown in FIG. 6(e), and if $v1-$ is positive, as shown in FIG. 6(h), then the roles of thyristors CR11 and CR14 are interchanged. Thyristor CR14 is now associated with the forward cycle instead of thyristor CR11 and vice versa, because of the inversion of the polarity of $e_1$ and $e_2$ compared to the case discussed above. This interchange of roles is evident from the table in FIG. 7, where all thyristor pairs shown for each column change from the first to the second row and vice versa for each of the cases, $i_1 > 0$ and $i_1 < 0$, respectively. This holds if the polarity of the operating phases $e_i > e_j$ is reversed to $e_j > e_i$, as for instance for $i = 1$ and $j = 2$. The necessity for this interchange of roles of thyristor pairs was explained with reference to FIGS. 2, 4, 5, 6, 7 and 8. Likewise, the roles of thyristors CR12 and CR14 are interchanged under the just stated conditions.

Returning now to the explanation of FIG. 10: Signal $v1^+$ is absent in the interval T1− and signal $v1^-$ prevails as indicated above. AND gates 71, 76, 81 and 86, thus, do not emit any signals. However AND gate 89 is energized in the presence of signal CS1.

Accordingly is CR14 fired via OR 88 and FPG 14 instead of CR11 at time $t = t_k$ indicated in FIG. 11(j). The back bias signal BB14 of CR14, which is analogous to the back bias signal of CR11 described before but with reversed polarity, is shown in FIG. 11(h); this signal BB14 is negative at time $t = t_k + T_{fk}$ and operates on AND gate 85 concurrently with signal $v1^-$. The ouput of AND 85 energizes OR 82, which in turn energizes FPG 12 and fires CR12 following the appearance of a back bias signal BB14 on CR14 as required by the table in FIG. 8. The simultaneous appearance of a back bias signal on thyristor CR21 required by FIG. 8 will become evident further on. The output of AND 85 also energizes AND 80 via diode D14 for $e_p = 1$ or AND 91 for $e_p = -1$ for appropriate firing of thyristor pairs CR52 and CR53 or CR62 and CR63, respectively, as explained for the case that $v1^+$ was positive.

Signal CS2 fires CR13 at time $t = t_{k+1}$ and in the presence of signal $v1^-$ via AND 79, OR 78 and FPG 13, analogous to the firing of CR14 explained above. The thyristors in block 64 continue to conduct the current in the same direction during the transistion of $i_1$ from CR12 to CR13; no trigger signals are, therefore, provided for the thyristors in block 64, as explained before. Current $i_1 = 0$ at time $t = t_{k+1} + T_{fk+1}$; thyristor CR13 is back biased and causes firing of CR11 via discriminator 74, AND 75, OR 72 and FPG 73 analogous to the firing of CR12 described before. Also thyristors CR51 and CR54 are fired for $e_p = 1$ by FPG 51 AND 54 in response to the just identified output signal of AND 75 which is transmitted via diode D13 and AND 90; thyristors CR61 and CR64 are fired via FPG 61, AND 64 and AND 92, if $e_p = -1$. At time $t = t_{k=2}$ CR14 is fired again in the above described manner and another cycle of the converter operation is initiated.

Block 324 identified in FIG. 9 is identical with block 314, except that all first numerical digits CR1i, DC1i, and FPG1i have been moved one digit ahead and $i = 1$, 2, 3, 4. For example, CR11 becomes CR21, DC12 becomes DC22 and FPG 13 becomes FPG 23. As far as the thyristors of block 63 are concerned, sub-block 6331-3 in FIGS. 2 and 10 becomes sub-block 6321-3 and sub-lock 6312-4 of the same figures becomes sub-block 6322-4. All thyristors of block 64 remain unchanged and so does the logic configuration as shown for block 314.

The inputs to block 324 are v2+ instead of v1+ and v2− instead of v1−; all other inputs are the same.

Analogously block 334, identified in FIG. 9 is identical with block 314, except that all first numerical digits CR1$i$, DC1$i$ and FPG1$i$ are moved by two digits ahead in the described manner. Thus, CR14 becomes CR34, DC11 becomes DC31 and FPG13 becomes FPG33. All other functions of the block are the same as those of block 314 and 324. The inputs to block 334 and v3+ instead of v1+ and v3− instead of v1−; all other inputs are the same.

Block 314, 324 and 334 implement in pairs gating of the thyristor firing pulses in block 63 according to the sequence defined in the explanation with reference to FIGS. 7 and 8 and implement in pairs gating of the thyristor firing pulses in block 64 according to the sequence explained with reference to FIGS. 10 and 11.

All explanations of converter control by blocks 1, 40 and 50 apply equally for the preferred embodiment of the invention shown in FIG. 3 as they were presented to the power system shown in FIG. 2.

The here disclosed coverter has been, so far, described to power the load 66 with energy which is supplied by a polyphase generator 61, as indicated in FIG. 1. Transfer of energy in reverse from the just named blocks 66 to 61 is achieved in one of several distinct modes of operation.

Two significant modes for this purpose are now described; they are characterized as "Case 1" in which $|v_o| < |e_i - e_j|_{av}$, and as "Case 2" in which the steady state (ss) values $|v_{oss}| < |e_i - e_j|_{avss}$, whereby the difference $|e_i + e_j|$ is the largest voltage difference between any two phases of 61 at any time ($i, j = 1, 2, 3; i \neq j$).

Case 1, as defined above, is explained first. It applies when the polarity of signal $e_p$ is reversed from +1 to −1 to vice versa. The polarity of the voltage $v_o$ across the load 66 then reverses. Load 66 supplies energy back to the generator during that part of the transient phase of polarity reversal of $v_o$ when the polarity of the load voltage $v_o$ and that of the filtered load current $i_o = |i_{1av}|$ differ. This process takes place automatically after the above assumed reversal of the polarity of $e_p$; the polarity of $e_d$ remains unchanged. The load voltage $v_o$ eventually passes through zero on its way to the opposite polarity. The flow of energy then reverses immediately its direction again; generator 61 now starts to supply, again, energy to the load which assumes its new polarity as commanded by the above assumed polarity reversal of signal $e_p$. The detailed steps of this process can be traced with proper interpretation of FIGS. 1 through 11; they are not specifically described here for brevity of presentation.

It is pointed out, however, that the polarities of $e_i - e_j$, as defined previously, and of $v_o$ are the same as viewed in the respective direction of current flow $i_1$; these two voltages reinforce each other in energizing the resonant LC$_1$ circuit identified in FIG. 2 and in the explanations with reference to that figure.

The above described process is of a transient nature. It occurs when the voltage polarity of a load which contains energy storage elements is reversed, such as a d.c. motor whose rotational motion is first braked and then reversed.

Case 1 is also applied when the voltage $v_o$ of block 66 is that of a d.c. generator which pumps energy into a polyphase network 61, as explained with reference to FIG. 1, and when $v_{oss} < |e_i - e_j|_{avss}$ the two voltages on both sides of the inequality sign above in this case. This fact is to be introduced in the power and in the control system; the explanations given with reference to FIGS. 1 through 5 are then interpreted accordingly, as well known to those skilled in the art.

Case 2 applies when $v_{voss} > |e_i - e_j|_{avss}$ as defined above. Here a source of d.c. energy 66 supplies a polyphase network 61 with steady state power. The polarity of signal $e_d$, which was assumed positive for all above presented explanations, is now negative, i.e., $e_d = -1$. Switch SW1 in block 314 now reverses the roles of signals v1+ and v1− in that block. The roles of thyristors CR11 and CR13 are thereby interchanged in the sense that now CR13 is first fired and CR11 is energized following the reversal of the polarity of the voltage over CR13; this is the converse of what was explained before with reference to FIG. 10 and is characteristic for the interchanged steady state roles of blocks 61 and 66. The sequence of groups of thyristors CR 11, 13, 51, 52, 53, 54, 61, 62, 63, and 64 fired by the control logic and by the firing pulse generators FP11 and FP13 of block 314 illustrated in FIG. 10 is summarized in Table 1 for the following conditions: $e_1 > e_2$ with operating phases 1-2 as defined in the explanations with reference to FIGS. 6 and 7; the various combinations for positive and negative values of $e_p$ and $e_d$, respectively; the therefrom resulting polarity of $i_1, v_o$; the relationship of $e_1 - e_2$ to $v_o$; and the direction of energy transfer. The content of Table 1 summarizes the explanations given with reference to FIG. 10; it reiterates the functional mechanism which governs the grouping of the thyristors identified in Table 1 depending upon the intended conditions of the converter operation.

Table 1

Engaged Phases: 1-2; $e_1 > e_2$

| CR Firing Sequence | Thyristors CR Fired | $i_1$ | $e_p$ | $e_d$ | $e_1 - e_2$* | $v_o$ | Energy Transfer From Block to* |
|---|---|---|---|---|---|---|---|
| 1 | 11 51 54 24 | >0 | 1 | 1 | >$v_o$ | >0 | 61 to 66 |
| 2 | 13 52 53 22 | <0 | 1 | 1 | >$v_o$ | >0 | 61 to 66 |
| 1 | 11 61 64 24 | >0 | −1 | 1 | >$v_o$ | <0 | 61 to 66 |
| 2 | 13 62 63 22 | <0 | −1 | 1 | >$v_o$ | <0 | 61 to 66 |
| 1 | 13 62 63 22 | <0 | −1 | −1 | <$v_o$ | >0 | 66 to 61 |
| 2 | 11 61 64 24 | >0 | −1 | −1 | <$v_o$ | >0 | 66 to 61 |
| 1 | 13 52 53 22 | <0 | 1 | −1 | <$v_o$ | <0 | 66 to 61 |
| 2 | 11 51 54 24 | >0 | 1 | −1 | <$v_o$ | <0 | 66 to 61 |

*except for transient or other conditions identified in the explanations.

The grouping of the thyristors associated with thyristors CR12, 14, 21, 23 with the thyristors of block 64 is derived from Table 1 by following the path of conduction of $i_1$ for $e_1 > e_2$, the desired polarities of $v_o$ and the desired directions of energy transfer, as governed by the polarity of $e_p$ and $e_d$. This procedure is reinforced by the summary of thyristor groupings in the first column of FIG. 7. The corresponding groupings of thyristors for the conditions $e_2 > e_1$ and for all other conditions follows then from application of the philosophy as explained above, supported by the other columns of the summary in FIG. 7. All possible combinations of a.c. to d.c. conversion which can be implemented with the here disclosed converter have been explained above. For those skilled in the art, it is obvious that energy could be derived from a d.c. source instead of the polyphse generator 61 indicated in FIG. 1. The thyristors in block 63 are then reduced to eight in number since only two power input terminals into blocks 62 and 63, respectively, are being used for a two wire d.c. generator input into the converter. The disclosed thyristor gating and control system can then be simplified accordingly, as readily understandable to those skilled in the art. Likewise, it is possible to connect a single phase a.c. source, via a full bridge rectifier to the just described two wire input of the converter to control the power flow to systems with sufficient engergy storage, such as d.c. motors. Operation in the four quadrants of the $v$-$i$ plane is attained for each of the above described modes of converter operation, as viewed from the respective d.c. converter terminals. Another obvious option is to connect the converter disclosed here with two input terminals as just-described, via a full wave diode bridge, to a polyphase generator for a one quadrant converter operation. Yet another, obvious option is to connect the same converter with two input terminals as described above via an antiparallel thyristor bridge (see the above cited reference: Bedford and Hoft), to a polyphase network for a four quadrant converter operation. Yet a further, obvious option is the use of half bridge converters instead of full bridge converters for these purposes (see same reference: Bedford and Hoft).

The output voltage $v_o$ of the here described coverter can be controlled by (1) the programming of the current and of the voltage control, respectively, as explained with reference to FIG. 4, and/or by (2) the polarity of the signal $e_p$ which controls the polarity of $v_o$. An arbitrary periodic or an aperiodic voltage signal $v_o$ can be attained in this manner, such as shown in FIG. 1, as well known to those skilled in the art.

Application of the here disclosed principles for devising a polyphase a.c. to polyphase a.c. converter is disclosed next.

FIG. 12 shows the combined block and circuit diagram of the above described system in its a.c. to a.c. conversion configuration. The system configuration is exactly the same as the one shown in FIG. 1, except for the polyphase output cyclo-down-up converter 641 which replaces the single phase converter 64 and except for the therewith associated polyphase filter 651 and the load $Z_{Lp}$, identified by number 661.

Shown in FIG. 12 is the three phase load $Z_{Lp}$, energized by sinusoidal currents in the individual phases. The three phase load configuration and the sinusoidal alternating currents are chosen for simplicity of presentation. The invention is neither restricted to the use of three phases nor to sinusoidal alternating currents. Any number of phases and any current shape can be accomplished with the here disclosed system.

The three load $Z_{Lp}$ derives its power from the three phase cyclo-down-up converter 641 via filter 651; this filter 651 consists of capacitors $C_{012}$, $C_{023}$ and $C_{013}$, each linking two of the three phases which feed load $Z_{Lp}$. The phase to neutral or "a.c. ground" coverter output voltages are characterized by the symbols $v_{o1}$, $v_{o2}$ and $v_{o3}$, respectively; thus phase 617 has a voltage $v_{o1}$ with respect to the a.c. ground, phase 618 has a voltage $v_{o2}$ with respect to ground, and phase 619 has the voltage $v_{o3}$ with respect to ground.

The "line-to-line" voltages well known to those skilled in the art are characterized by symbols $v_{o12}$, $v_{o23}$ and $v_{o13}$. The individual indices of capacitors $C_{012}$, $C_{023}$ and $C_{013}$ in filter 651 are identical with the same indices of the line to line voltages and, thus, link the corresponding lines of the three phase system.

The physical configuration of the cyclo-down-up coverter 641 is identical with that of the cyclo-up-down converter 63. Six thyristors which will be further identified are connected to the same lines 123 and 124 of the series resonant circuit of the system, as identified and discussed with reference to FIGS. 2 and 3. Series capacitor $C_1$ and inductor L are shown in FIGS. 12. Also indicated is block 63 to which are presumed to be connected, in succession, filter 62 and the source of energy 61 as identified in FIGS. 1, 2, and 3.

Operation of the cyclo-down-up converter 641 is first stated in general terms and further explained in more detail with reference to all other eleven figures of this specification.

Cycloconverter 641 performs the converse function of cycloconverter 63. Cycloconverter 63 derives low frequency electric power from the three individual phases of the source of energy 61 via filter 62 and transforms this power into high frequency single phase power as described before with reference to FIGS. 2 and 3; this high frequency power is transferred, via the series resonant elements $C_1$ and L, to the cycloconverter 641. The cycloconverter 641 distributes the just indicated high frequency power to three phases, which, in turn, feed a.c. currents individually to the three phase load $Z_{Lp}$ via filter 651.

The process of inversion of d.c. power to three phase a.c. power fed into a "live" three phase power system via a controlled full wave bridge consisting of six thyristors is well known to those skilled in the art and is documented in the fourth above cited reference. This method finds wide application in the inversion process used in high voltage d.c. power transmission systems. The just described process is the converse of controlled three phase a.c. to d.c. conversion with use of a full wave thyristor bridge.

The cyclo-up converter action of block 63, described with reference to FIG. 2, is the analog, of (but not the same as) the three phase a.c. to d.c. conversion process just referred to before. The cyclo-down converter action of block 641 is the converse of this process and, in the same sense as just described, is the analog of, (but not the same as) the above referred to d.c. to a.c. inversion process.

Operation of the cycloconverter 641 in conjunction with filter 651 and load 661 is now described in detail with reference to FIG. 12.

Operation of the twelve thyristors in block 641 is described first in conjunction with the twelve thyristors of block 63 for purpose of explanation of the power conversion process. The energizing of all thyristors by way of firing signals which emanate from the converter control system is also illustrated in FIG. 12 and is explained further on.

The resonant current $i_1$ is at all times carried by one pair of thyristors in block 63 and simultaneously by another pair of thyristors in block 641. Selection of the thyristors in block 63 is made in exactly the same way as previously described with reference to FIGS. 7 and 8 and as required by the source voltages $e_1$, $e_2$ and $e_3$. The thus determined thyristors of block 63 then carry the resonant current $i_1$ during the respective time intervals $T_{ok}$ as described also with reference to FIGS. 6, 9, 10 and 11. The same current $i_1$ is carried by one pair of thyristors in block 641 for each time interval $T_{ok}$ and for each of its subdivisions $T_{fk}$ or $T_{rk}$, respectively.

These thyristors of block 641 are selected in a manner so that the individual lines 617, 618 and 619 carry currents $i_{o1}$, $i_{o2}$ and $i_{o3}$, respectively beyond filter 651 and in such a manner that the time wave forms of these currents are analogous in shape to the waveforms of the three phase voltages $e_{r1}$, $e_{r2}$ and $e_{r3}$ of the refernce signal generator 800. This same signal generator emits three sine wave a.c. signals spaced with a phase angle of 120° with respect to each other, thus representing a conventional three phase a.c. signal as well know in the art. The output signals of block 800 are indicated in FIG. 12(b). The time interval $T_{r1}+$ analogous to the time interval T1+ indicated in FIG. 6; the time $T_{r2}+$ is analogous to the time interval T2+ also indicated in FIG. 6; the symbol pairs $T_{r3}+$ are T3+, $T_{r1}-$ and T1−, $T_{r2}-$ and T2−, $T_{r3}-$ and T3−are individually related in the same sense. However, the length of these time interval pairs is not, necessarily, identical since the frequency and the amplitudes of the signals emitted by block 800 are variable and determined by input signals $ca_{rf}$ and $ca_{rr}$, respectively. Input signal $ca_{rf}$ to block 800 determines the frequency, and input signal $ca_{rr}$ to the same block determines the amplitude of its three phase reference output signal. This three phase reference signal is attenuated and rectified in block 801 and then conveyed as signal $e_{rr}$ to the Power Systems Control contained in block 211.

The power control system determines the average value of the resonant current $i_1$ for each individual cycle according to the reference signal $e_{rr}$ emanating of block 801. The Thyristor Gating and Firing System for Cycloconverter 641 then sleects the respective pairs of thyristors for each time interval $T_{fk}$ and $T_{rk}$, respectively, so that the sum of the above referred to currents $i_{o1}$, $i_{o2}$ and $i_{o3}$ is a replica of the output signal $e_{rr}$ of block 801 at any time. If the sum of $i_{o1}$, $i_{o2}$ and $i_{o3}$ has the form just described and if the thyristors in block 641 are so gated that line 617 carries positive current pulses to filter 651 in the time intervals $T_{r1}+$ and, corollary, conversion negative current pulses in the time intervals $T_{r1}-$ and if the analogous process takes places in line 618 and 619, respectively, with reference to time intervals $T_{r2}+$, $T_{r2}-$, $T_{r3}+$ and $T_{r3}-$, respectively; then the converse of the conversion process in block 63 is performed by decomposing current $i_1$ into three phase currents which appear as the converter output currents $i_{o1}$, $i_{o2}$ and $i_{o3}$ after filter 651. However, $i_{o1}$, $i_{o2}$ and $i_{o3}$, the just referred to converter output currents, are a replica of signals $e_{r1}$, $e_{r2}$ and $e_{r3}$, respectively, when matching the indices of the $e_{ri}$ with the $i_{o1}$. The amplitude and frequency of the $e_{ri}$ are determined by inputs $ca_{rr}$ and $cf_r$ as explained above. The polyphase power derived from the source of energy 61 with a given voltage and frequency is thus transformed to polyphase power with another arbitrarily determined current and frequency which is fed into load $Z_{Lp}$. The well known process of three phase a.c. to d.c. conversion followed by d.c. to three phase a.c. inversion is improved by the here disclosed invention in a number or of ways: (1) output currents and voltages can be attained without the presence of an a.c. power device in the form of a polyphase generator or "rotating condensor" connected to the output terminals of the disclosed converter, as well known in the art; (2) a necessity for forced commutation of thyristors nowhere in the conversion process arises; (3) the power factor, as viewed from the source of electric energy 61 and as viewed from the input terminals of the load $Z_{Lp}$, is near its maximum value 0.955 for any conditions of converter operation. The load system 661 could include a load input filter to allow functioning of the actual load mechanism at its inherent power factor such as the one required by an induction machine. The disclosed system then serves as a converter of (a) voltage or curruent, (b) frequency and (c) of power factor.

The control system of the now disclosed polyphase a.c. to polyphase a.c. converter, illustrated in FIG. 12, consists of the power control system 211, the attenuator 401, the reference signal source 800, the attenuator and full wave rectifier 801, the thyristor gating and firing system 301 for cycloconverter 63, and the thyristor gating and firing system 302 for cycloconverter 641. Current sensor 1 is also associated with the converter control system.

The reference signal generator 800 with conventional three phase a.c. sine wave output has an input $ca_r$, to control uniformly the amplitude and has an input $cf_r$, to control uniformly the frequency of all three phases of its output. This type of signal generator is well known to those skilled in the art. The output signal of generator 800 with phase voltages $e_{r1}$, $e_{r2}$, and $e_{r3}$ is shown in FIG. 12(b). Attenuator and full wave rectifier 801 attenuates and rectifies the just identified output signal of block 800 as well known in the art, thus forming the single input signal $e_{rr}$ to the power control system 211. Another input signal to block 211 is provided by the current sensor 1 which is identical with the same signal described with reference to FIGS. 2, 4 and 5.

The power control system 211 is identical with the power control system 21 described with reference to FIGS. 4 and 5, except that in FIG. 4 reference signal $e_r$ and the controllable attenuator $a_{rr}$, identified as block 8, are eliminated including the current control input $ca_{rr}$. The output terminal of the removed block 8, serves now as a new input terminal to which the above described output signal $e_{rr}$ of block 801 is connected. The former block 21 thus assumes the configuration of the new block 211 exactly in the above described manner. Block 211 processes the reference signal $e_{rr}$ instead of the former signal $a_{rr}e_r$, in exactly the same manner as previously described for block 21 with reference to FIGS. 2, 4, and 5. Singal $e_{rr}$ is a full wave rectified three phase a.c. signal, as well known in the art, and constitutes a d.c. signal to which a ripple is superimposed with an approximately 4 percent rms first harmonic content at six times the single phase frequency of the rectified signal. Summer 7 thus admits in the block 211 configuration a d.c. signal $e_{rr}$ which contains a ripple, rather than the smooth d.c. signal $a_{rr}e_r$ in the block 21 configuration. The effect of voltage feedback in response to the signal $k_{oz}v_{oz}$ emitted by block 401 is introduced further on. The explanation of the current control system is continued first.

The power control system emits control signals CS1 and CS2, as discussed with reference to FIGS. 2, 4 and 5, which are conveyed via connections 107 and 108, respectively, to the above identified block 301. This block 301 is identical with the block 30 shown in FIG. 9 except that all functions for firing thyristors CR51 through CR54 and CR61 through CR64 have been removed from subsystems 314, 324 and 334, respectively since there are not such thyristors in the system shown in FIG. 12. This means that blocks 80 and 91 through 96 and furthermore, diodes D11 through D14 are removed from the subsystems 314, 324 and 334. These subsystems are otherwise exactly the same as before; after removal of the above enumerated blocks they are called in their modified form 3141 derived from 314, 3241 derived from 324, and 3341 derived from 334. These just identified subsystems are part of the Thyristor Gating and Firing System for Cycloconverter 63 and thus provide firing signals for thyristors CR11 through CR14, CR21 through CR24 and CR31 through CR34 in response to signals CS1 and CS2 in exactly the same sequence as described with reference to FIGS. 6 through 11 above. This sequence is also controlled by signal $e_d$ as previously described with reference to FIG. 10.

The Transistor Gating and Firing System for Cycloconverter 641, identified as block 302 is identic in structure with the above described block 301, except that it provides the firing signals for the thyristors in block 641, namely, thyristors CR71 through CR74, CR81 through CR84 and CR91 through CR94. These thyristors are placed in subsystems 3142, 3242 and 3342. Subsystem 3142 is identical with subsystem 3141, except that thyrsitor CR71 is substituted for CR11, thyristor CR72 for CR12, thyristor CR73 for CR13 and thyristor CR74 is substituted for thyristor CR14. Thus, thyristors CR7$i$ are substituted for thyristors CR1$i$, where $i = 1, 2, 3, 4$. Subsystem 3242 is identical with subsystem 3241, specified above, except that thyristors CR8$i$ are substituted for thyristors CR2$i$ in subsystem 3241; $i = 1, 2, 3, 4$. Subsystem 3342 is identical with subsystem 3341, except that thyristors CR9$i$ are substituted for thyristors CR3$i$ in subsystem 3341; $i = 1, 2, 3, 4$.

System 302 selects the thyristors in block 641 according to the signals $e_{r1}$, $e_{r2}$ and $e_{r3}$ which emanate from block 800; these signals have been described above with reference to FIG. 12(b). Signals $e_{r1}$, $e_{r2}$ and $e_{r3}$ determine the selection of the thyristors of block 641 in the same manner that as signals $e_1$, $e_2$ and $e_3$ determine the selection of the thyristors in block 63. This selection is made according to the relative polarity and magnitude of signals $e_{r1}$, $e_{r2}$ and $e_{r3}$, analogous to the description of the thyristor selection processes described for the thyristors of block 63 with reference to FIGS. 6 through 11. Yet, the just referred to selection is now perfomred according to the polyphase signal with variable frequency which emanates from block 800.

The pattern of current pulses $i_1$ delivered selectively to two specific phases of the output filter 651 is in the steady state, in principle, identical with that of the current pulses which enter block 63. The individual current pulses are, in fact, identical since the same current $i_1$ flows through one pair of thyristors in block 63 and another pair of thyristors in block 641. However, the spectral content of the trains of current pulses processed by block 63 is, in principle, different from the spectral content of the trains of current pulses processed in block 641 because of the difference in frequency between the signal groups $e_1$, $e_2$, $e_3$ and $e_{r1}$, $e_{r2}$, $e_{r3}$, respectively, and because of the difference in the relative signal magnitude of these signal groups. This process is treated in more detail by F. C. Schwarz, in "Power Processing" NASA-SP 244, GPO 1971 and in the therein quoted references.

The current pulse train referred to above enters filter 651 by any of the terminal pairs selected from connections 617, 618 and 619. The individual groups of current pulses follow the pattern $e_{r1} - e_{r2}$ for $0 < t < T_{r1}^+/2$; $e_{r1} - e_{r3}$ for $T^+_{r1}/2 < t < T^+_{r1}$; $e_2 - e_{r3}$ for $T^+_{r1} < t < T^+_{r1} + T^+_{r2}/2$; Sequence continues in an analogous manner as explained for phases $e_1 - e_j$ with reference to FIG. 6. The current pulse group generated during the respective time intervals indicated in Table 2 enter the terminal pairs of filter 651, as shown in that table. The relative average value of the Table 2.

| Time Interval | Terminal Pair of Filter 651; Positive Terminal is shown first. |
|---|---|
| $0 < t < T_{r1}^+/2$ | 617-618 |
| $T_{r1}^+/2 \leq t < T_{r1}^+$ | 617-619 |
| $T_{r1}^+ < t < T_{r1}^+ + T_{r2}^+/2$ | 618-619 |
| $T_{r1}^+ + T_{r2}^+/2 < t < T_{r1}^+ + T_{r2}^+$ | 618-617 |
| $T_{r1}^+ + T_{r2}^+ < t < T_{r1}^+ + T_{r2}^+ + T_{r3}^+/2$ | 619-617 |
| $T_{r1}^+ + T_{r2}^+ + T_{r3}^+/2 < t < T_{r1}^+ + T_{r2}^+ + T_{r3}^+$ | 619-618 | current per pulse cycle follows the curve of $e_{ri} - e_{rj}$ ($i, j = 1, 2, 3; i \neq j$) as explained above for each of the intervals $T_{rk}^+$ ($k = 1, 2, 3$) identified in FIG. 12(b) and contained in Table 2. The averages of the concerned groups of pulses entering each of the phase leads 617, 618 and 619 are the equivalent to single current pulses which would be fed from a d.c. current source via a line commutated thyristor bridge into a three phase network (see cited reference, Bedford and Hoft), except that termination of the phase currents emanating from the disclosed converter can be determined by the converter logic rather than to be load dependent. Thus no line commutation of thyristors is required.

Reversal of direction of rotation of a machine is accomplished by reversal of the order of succession of phases with voltages $e_{r2}$ and $e_{re}$ in block 800, as well known to those skilled in the art. The transient conditions which occur during the duration of the reversal process are analogous to those characterized as "Case 1" and described above with reference to FIG. 10 for polarity reversal of a load containing energy storage elements.

Signal $e_d$ is set to $e_d = -1$ for steady state feeding of a polyphase network 61 from a polyphase generator 66. Again, the selection of thyristor pairs in blocks 63 and 641 implements then the appropriate routing of current $i_1$ which is analogous to the process described in "Case 2" above with reference to FIG. 10 for steady state transfer of energy from block 66 to block 61 shown in FIG. 1.

The line output voltages $v_{o1}$, $v_{o2}$ and $v_{o3}$ with respect to the output reference node of ground are fed via attenuator 407, 408 and 409 into a phase shifter and full wave rectifier 402, which shifts the incoming signals in phase so that they will be in phase synchronism with the reference. The signals emanating from block 800 would form, after rectification, a scaled replica of signal $e_{rr}$.

Figure 5:
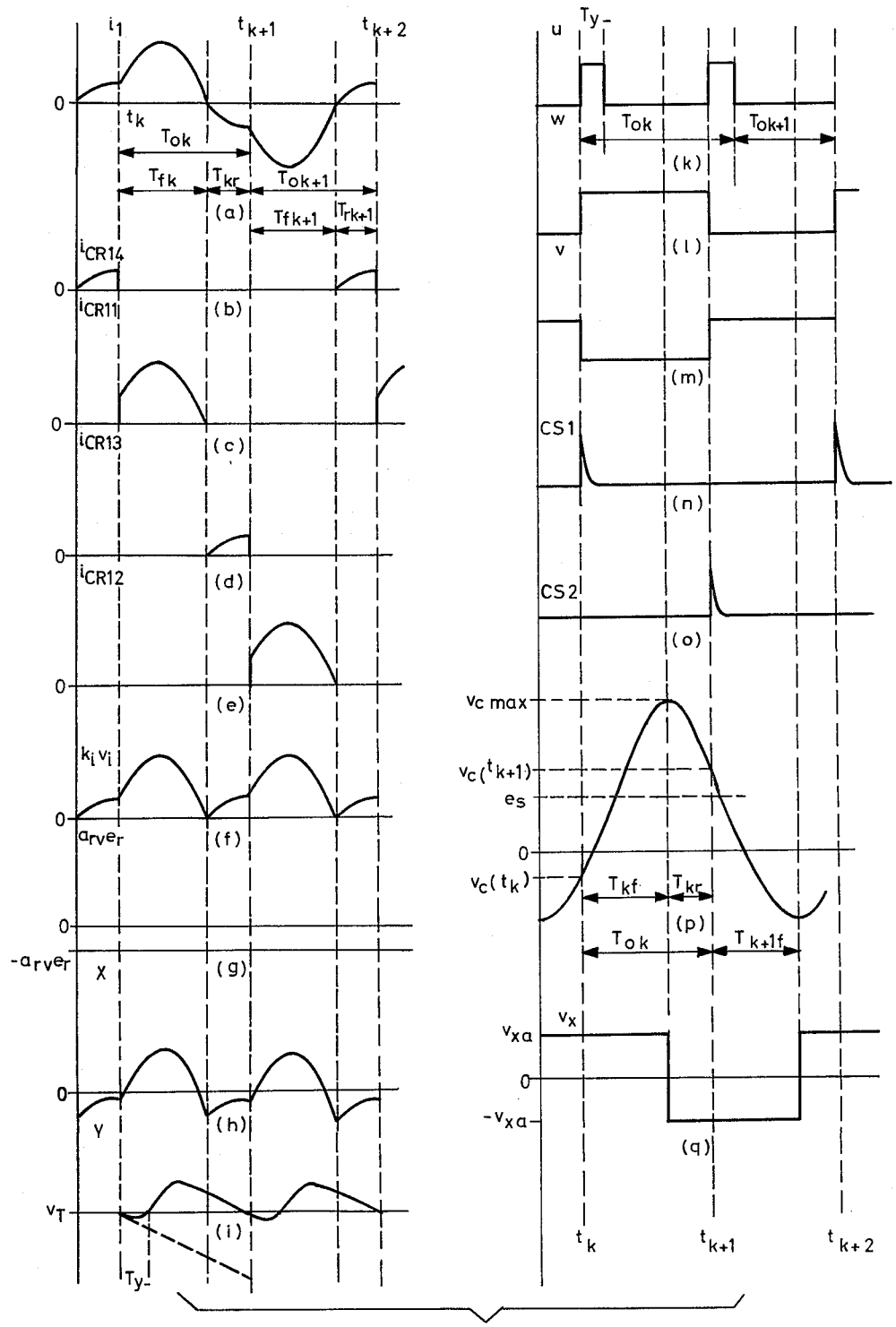
FIGS. 5(a) through 5(g) show critical voltage and current waveforms in the power system shown in FIGS. 3 and 4, respectively provided only two of the three phases of the source of supply were energized with an appropriate d.c. voltage and provided the ppropriate thyristors, as described further on, were fired at the specified instants of time.

These two d.c. signals with almost identical waveform are compared within block 211, in the same manner as previously described for block 21, and for the d.c. output with reference to FIGS. 4 and 5. The feedback system provides the appropriate correction for the timing of control signals CS1 and CS2 which govern the process of pulse modulation in the same manner as previously described and just referred to above, including the use of the signals emanating from current transformer 1.

The here disclosed converter can be used as a four quadrant a.c. and d.c. to a.c. and d.c. converter, a completely bilateral device that can transfer energy from any of the two parts to the other. All application forms in conjunction with external bridges of diodes or thyristors, which were indicated with the discussion of FIG. 10, can be attached to any of the two or both parts of the disclosed system, even though the system can perform its functions without the use of these external bridges.

All explanations of the system described with reference to FIG. 12 and FIG. 2 apply as well with reference to FIG. 12 and FIG. 3 which contain transformer 2 for the purpose of impedance transformation and/or ohmic isolation of the input and the output circuits.

Figure 13:
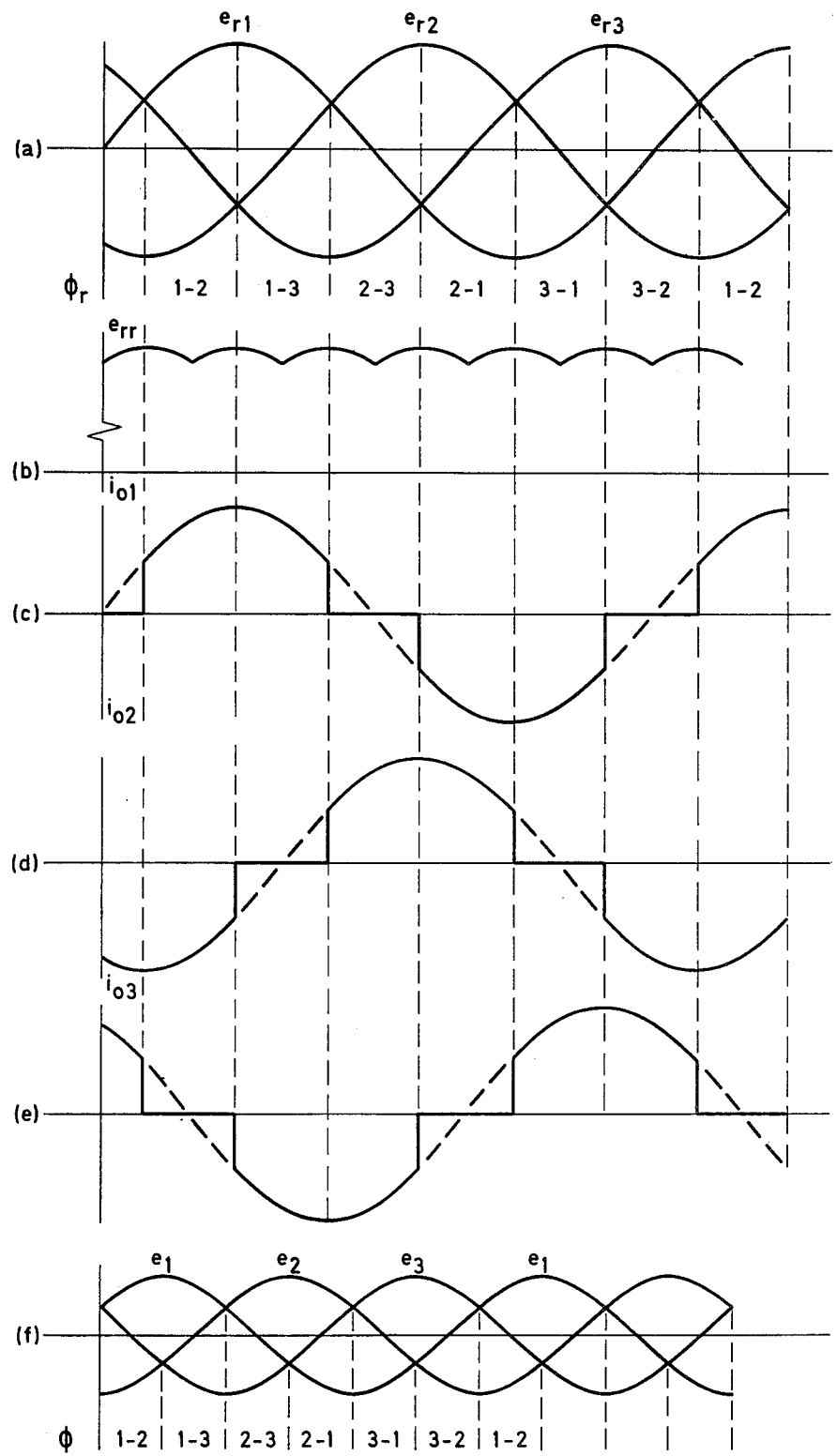
FIGS. 13 (a) through (f) show significant signal waveforms associated with the transfer of electric energy to a polypahse system through the resonant circuit.

FIGS. 13(a) through (f) are added for further clarification of the generation of the polyphase a.c. output power which enters block 66. A three phase reference a.c. signal is shown in FIG. 13(a). The amplitudes of the phase voltages $e_{r1}$, $e_{r2}$ and $e_{r3}$ are, usually, equal to each other, but different form the amplitudes of the source voltages $e_1$, $e_2$ and $e_r$ shown in FIG. 13(f). The frequency of said reference voltage signal is, usually, also different from the frequency of said source voltages.

The rectified reference voltage signal is shown in FIG. 13(b). The phase currents $i_{o1}$, $i_{o2}$, and $i_{o3}$ are shown in FIGS. 13(c), (d) and (e), respectively. Generation of these currents is due to the combined effect of the gating of the thyristors in block 641 according to the relative polarity and magnitude of voltage difference between the reference voltage phases and according to the redecomposition effect of signal $e_{rr}$ which serves now as the current reference signal, as previously described. Signal $e_{rr}$, which is composed from the phases of the voltage reference signal by rectification in block 801, causes a corresponding average flow of current $i_1$ into block 641. This current flow is distributed to pairs of phases according to the previously described gating process by the Thyristor Gating and Firing System of block 302. The concerned phases $\Phi_r$ of the reference signal are identified below the same reference signal; the first numeral indicates the phase with the higher potential. The waveforms shown in FIGS. 13(b), (c) and (d) add up to a scaled replica of said signal $e_{rr}$ and are identical in form with the contributions of $e_{r1}$, $e_{r2}$, and $e_{r3}$ to $e_{rr}$.

Figure 14:
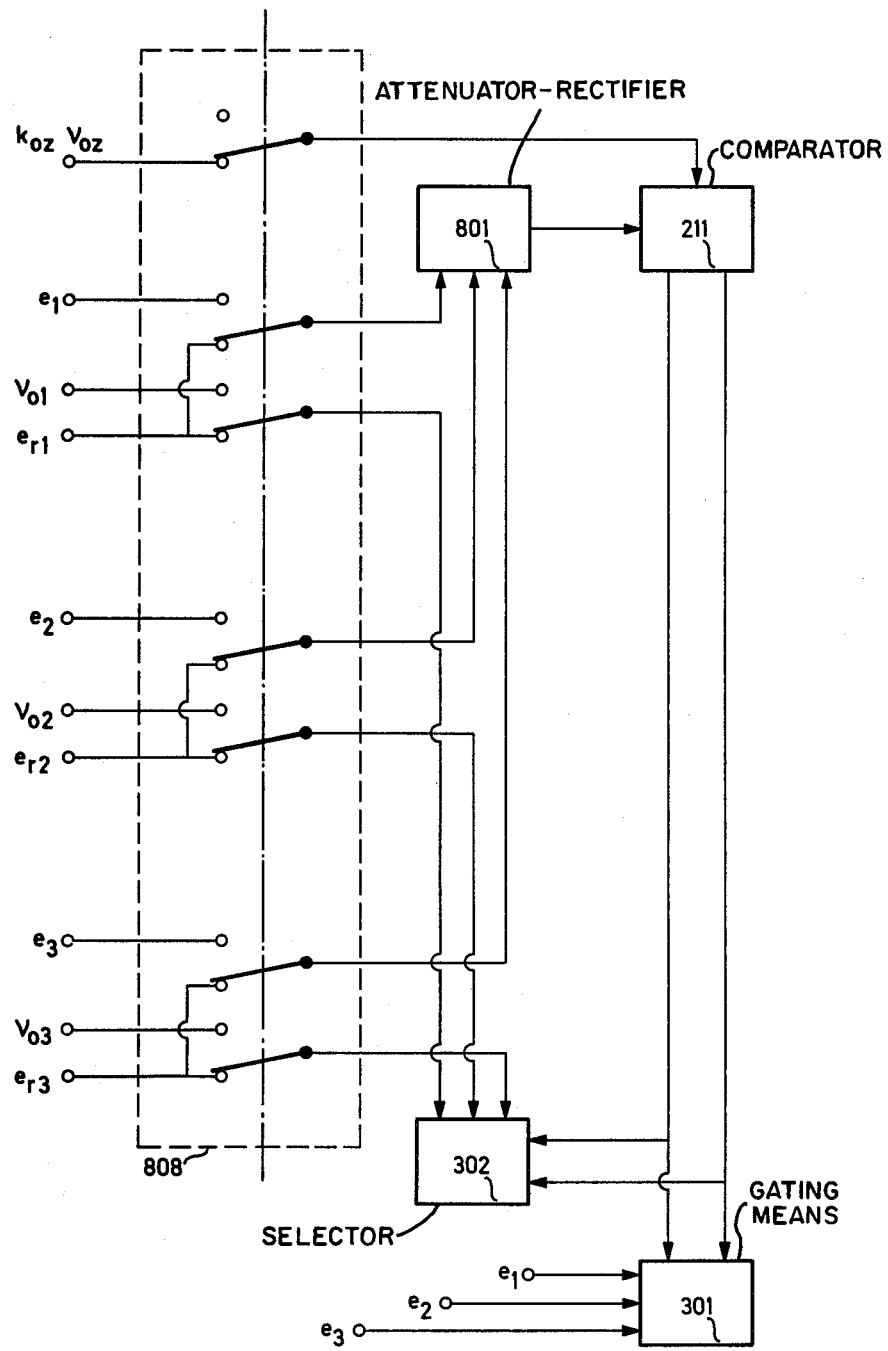
FIG. 14 is the block diagram of the reconfigurable part of the power control system for forward transfer of energy from the source to the load, and for reversal of transfer of energy from the load terminals to the source.

FIG. 14 shows the reconfigurable part of the Converter Control System 50 for the purpose of reversal of flow of the energy, previously referred to as "Case 2". The position of switch 808 in FIG. 14 is shown for the transfer of energy from the source 61 to the load 66 and for reversal of the flow of energy previously referred to as "Case 1". The connections for the two positions of switch 808 are summarized below in Table 1. For energy Table 2.

Connections of Switch 808.

| Signal | Block No. Connection for Energy Transfer to | |
|---|---|---|
|  | Load | Source("Case 2") |
| $k_{oz}v_{oz}$ | 211 | — |
| $e_1$ $e_2$ $e_3$ | — | 801 |
| $v_{o1}$ $v_{o2}$ $v_{o3}$ | — | 302 |
| $e_{r1}$ $e_{r2}$ $r_{r3}$ | 801 302 | — | transfer to the source according to "Case 2" the position of switch 808 shown in FIG. 14 is altered, as indicated in Table 2.

The thyristors of block 641 are now gated according to the polarity and magnitudes of voltages $v_{o1}$, $v_{o2}$ and $v_{o3}$ of the pairs of load phase terminals which could be powered from a polyphase a.c. generator. This mode of gating replaces the gating process according to the signals of the reference voltage generator 800, which is disconnected from the circuit. The current reference signal is now provided by the phases of source 61 for synchronization of the current transfer into these phases with their respective polarity and magnitude, consistent with the preceeding descriptions.

What is claimed:

1. A high frequency link converter for transferring electrical power between a first power system and a second power system with each of the power systems operating with at least two power system connectors, comprising in combination:

capacitor means;

inductor means connected to said capacitor means forming a series resonant circuit with said capacitor means;

a first and a second set of controllable switch means connecting said series resonant circuit between the first and second power system connectors;

said first and second set of controllable switch means capable of controlling supply and return current between the first and second power systems connectors:

control means connected for selectively energizing at least two switch means of each of said first and second sets of controllable switch means in accordance with the available potential between one of said first and second power system connectors to transfer electrical power between the first and the second power systems through successive alternate directional current flows into and out of either side of said series resonant circuit and into and out of the first and second power system connectors;

said control means including current sensor means for providing a current sensor output in accordance with the current flow relative to said capacitor means;

a current reference output;

means providing an algebraic summing output of said current sensor output and said current reference output;

integrator means for integrating said summing output; and means receiving the output of said integrator means for activating conduction of said switch means to substantially control the average current for each half cycle of oscillation of operation of said resonant circuit.

2. A converter as set forth in claim 1, wherein said switch means include electronic devices.

3. A converter as set forth in claim 1, wherein said switch means include thyristors.

4. A converter as set forth in claim 1, wherein said current sensor means determines the voltage on said capacitor means in accordance with the current flow thereto;

and said receiving means enabling the next successive alternating directional current flow through said series resonant circuit when the voltage on said capacitor means is below a preselected voltage level.

5. A converter as set forth in claim 1, wherein said control means include;

voltage sensor means for providing a voltage sensor output in accordance with the voltage across one of the first and second power source connectors;

a summing device for providing a summing output from the combination of said current sensor output aand said voltage sensor output;

said integrator means integrating said summing output providing a signal in relation to the voltage on said capacitor means which is modified by variation in the voltage across said one of the first and second power source connectors;

a threshold sensor providing a threshold output upon detecting a given signal level of said integrator means indicating that the voltage on said capacitor means is below a given voltage level;

and bistable means responsive to said threshold sensor to enable in succession, upon a threshold sensor output, selective gating of said switch means by injection of current control signals, to conduct alternating currents through said resonant lcircuit.

6. A converter as set forth in claim 1 wherein said control means includes:
first voltage monitor means to sense the voltage of each of the first power source connectors;
first voltage attenuator means to attenuate each of the outputs of said first monitor means;
first discriminator means for processing the outputs of said first attenuator means to identify the polarity and the largest potential differences between all the first power source connectors; and
first gating means for selectively gating said switch means to carry the next successive series resonant current.

7. A converter as set forth in claim 1 wherein said control means includes
variable reference signal means; and
full wave rectifier means to provide a rectified output of said variable reference signal means to serve as said current reference output.

8. A converter as set forth in claim 1 wherein said control means include
variable reference signal means;
second voltage sensor means for providing a second voltage sensor output in accordance with the voltage of each of the second power system connectors;
attenuator means to provide attenuated output signals of said second voltage sensor outputs;
phase shifter means to shift said attenuated output signals to be in synchronism with the output signal of said variable reference signal means;
full wave rectifier means to rectify the output signals of said phase shifter means to provide a phase shifted feedback signal;
full wave rectifier means to provide a rectified output of said reference signal means to serve as said current reference output;
said summing means providing the algebraic sum of said current sensor output, said phase shifted feedback signal and said current reference output;
threshold sensor means providing a threshold output upon detecting a given signal level of said integrator means indicating that the average current of one said half cycle of said resonant circuit is identical with the scaled average of said current reference output as modified by said phase shifted feedback signal indicating that the voltage on said capacitor means is below a preselected voltage level; and
bistable means responsive to said threshold sensor to enable in succession, upon a threshold sensor output, selective gating of said switch means by injection of current control signals to conduct alternating currents through said resonant circuit.

9. A converter as set forth in claim 1 wherein said control means includes said current reference output consisting of a rectified variable reference signal means;
first voltage monitor means to sense the voltage of each of the power system connectors;
first voltage attenuator means to attenuate each of the outputs of said first monitor means;
first discriminator means for processing said first voltage attenuator means to identify the polarity and the largest potential difference between all of the first power system connectors;
first gating means to render selected ones of the otherwise positively disabled first set of switch means as identified by said first discriminator means output, susceptible to carry the next following portion of said series resonant current;
reference signal discriminator means which process the output of said reference signal means to identify the polarity and the largest potential difference between the terminals of said reference signal means;
second gating means to render selected ones of the otherwise positively disabled second set of switch means as identified by said refernce signal discriminator means output, susceptible to carry the next following portion of said series resonant current.

10. A converter as set forth in claim 1 wherein said control means include:
first voltage monitor means to sense the voltage of each of the first power system connectors;
first voltage attenuator means to attenuate each of the outputs of said first voltage monitor means;
first discriminator means for processing the outputs of said attenuator means to identify the polarity and the largest potential difference between all of the first power system connectors;
first gating means to render selected ones of the otherwise positively disabled first switch means as identified by said first discriminator means output, susceptible to carry the next following portion of said resonant current for transfer of energy between the first and the second power systems;
second voltage monitor means to sense the voltage of each of the second power system connectors;
second voltage attenuator means to attenuate each of the outputs of said second voltage monitor means;
second voltage discriminator means which process the outputs of said second voltage attenuator means to identify the polarity and the largest potential difference between all of the second power system connectors;
second gating means to render selected ones of the otherwise positively disabled second set of switch means as identified by said second voltage discriminator means output, susceptible to carry the next following portion of said resonant current for transfer of energy between the first and the second power systems; and
energy transfer direction signal means acting upon said first and second gating means as to cause a reversal in the order of conduction of said first and second switch means by reversing the order of succession of susceptibility to be enabled to conduct current.

11. A converter as set forth in claim 1, wherein said control means include:
   first voltage monitor means to sense the voltage of each of the first power system connectors;
   first voltage attenuator means to attenuate each of the outputs of said first voltage monitor means;
   variable reference signal means;
   full wave rectifier means to provide the rectified output of said reference signal means to serve as said current refernce output.

12. A converter as set forth in claim 1 wherein said control means include:
   polarity control signal means;
   second gating means to render selected ones of the otherwise positively disabled second switch means as identified by the output of said output voltage polarity control signal which connect said series resonant circuit to said second power system connectors susceptible to be enabled as to cause a specific load voltage.

13. A converter as set forth in claim 1 further comprising:
   transformer means with primary winding means forming a part of said series resonant circuit.

14. A converter as set forth in claim 1 wherein said first and second set of switch means are established to form a half bridge configuration;
   and each of said switch means consists of one pair of unidirectional switch means in antiparallel configuration; each of said switch means can provide connection to one terminal of said series resonant circuit.

15. A converter as set forth in claim 1 wherein said first and second set of switch means are established to form a half bridge configuration;
   and each of said switch means consists of one bidirectional switch means which can provide connection to one terminal of said series resonant circuit.

16. A high frequency link converter for transferring electrical power between a first power system and a second power system with each of the power systems operating with at least two power system connectors, comprising in combination:
   capacitor means;
   inductor means connected to said capacitor means forming a series resonant circuit with said capacitor means;
   a first and a second set of controllable switch means connecting said series resonant circuit between any of the first and second power system connectors;
   said first and second set of controllable switch means capable of controlling supply and return current between any of the first and second power system connectors;
   control means connected for selectively energizing at least two switch means of each of said first and second sets of controllable switch means in accordance with the available potential between one of first and second power system connectors to transfer electrical power between the first and the second power systems through successive alternate directional current flow into and out of either side of said series resonant circuit and into and out of the first and second power system connectors;
   said control means including current sensor means for providing a current sensor output in accordance with the current flow relative to said capacitor means;
   integrator means for integrating said current sensor output to determine the voltage on said capacitor means in accordance with the current flow thereto; and
   means for enabling the next successive conduction of said switch means upon detecting a given signal of said integrator means indicating that the voltage on said capacitor means is below a given voltage level.

17. A high frequency link converter for transferring electrical power between a first and a second power system with each of the power systems operating with at least two power system connectors, comprising in combination:
   capacitor means;
   inductor means connected to said capacitor means forming a series resonant circuit having a first and a second terminal;
   a first set of controllable bidirectional switch means including switches connecting said first resonant circuit terminal to each of said connectors of the first power system;
   a second set of controllable bidirectional switch means including switches connecting said second resonant circuit terminal to each of said connectors of the second power systems;
   said first and second switch means including switches for connecting the first power system connectors to the second power system connectors in parallel with said series resonant circuit;
   control means for selectively energizing at least two of said first set of controllable switch means concurrently with at least two of said second set of controllable switch means to connect any two selected first power system connectors to any two selected second power system connectors with said series resonant circuit interposed between one of said connections;
   said control means controlling the net flow of electrical power from the first power system to the second power system by successive alternate directional current flow through said series resonant circuit;
   said control means energizing said first set of controllable switch means in accordance with the power requirements of the second power system and energizing said second set of controllable switch means in accordance with a required current waveform for the second power system; and
   said control means energizing conduction of a nonconducting controllable switch means to change the current flow path through one of said first and second sets of controllable switch means during intervals of unidirrectional current flow through said series resonant circuit.

* * * * *

UNITED STATES PATENT AND TRADEMARK OFFICE
CERTIFICATE OF CORRECTION

PATENT NO. : 4,096,557

DATED : June 20, 1978

INVENTOR(S) : Francesc C. Schwarz

It is certified that error appears in the above-identified patent and that said Letters Patent are hereby corrected as shown below:

Col. 1, line 39, delete "limiations" and insert --limitations--;
Col. 2, line 59, delete "voltge" and insert --voltage--;
Col. 3, line 48, "ppro-" should be --appro--;
Col. 4, line 18, delete "polypahse" and insert --polyphase--;
Col. 5, line 5, "First a cyclo-up converter 63 derives" should be beginning of new paragraph;
Col. 6, line 8, delete "currently" and insert --concurrently--;
Col. 6, line 13, delete "discusses" and insert --discussed--;
Col. 7, line 42, "The thyristor gating" should be beginning of new paragraph;
Col. 8, line 12, "$K_{02}$" should be --$K_{01}$--;
Col. 9, line 17, after "ground" delete ";" and insert --.--;
Col. 9, line 18, delete "second" and insert --Second--;
Col. 10, line 16, delete "not" and insert --now--;
Col. 12, line 62, delete "rv" and insert --$a_{rv}$--;
Col. 13, line 24, delete "$V_{ov}Vo$" and insert --$a_{ov} Vo$--;
Col. 14, line 41, after "respective" insert --relative--;
Col. 15, line 36, "$Vl^{30}$" should be --$Vl^{+}$--;
Col. 16, line 61, "Cr 13" should be --CR 13--;

UNITED STATES PATENT AND TRADEMARK OFFICE
CERTIFICATE OF CORRECTION

PATENT NO. : 4,096,557

DATED : June 20, 1978

INVENTOR(S) : Francesc C. Schwarz

It is certified that error appears in the above-identified patent and that said Letters Patent are hereby corrected as shown below:

Col. 17, line 59, "CR 61" should be --CR 62--;
Col. 17, line 63, after "(p)" insert --This firing occurs--.
Col. 20, line 17, "$V_{voss}$" should be --$V_{oss}$--;
Col. 23, line 36, "sleects" should be --selects--;
Col. 24, line 10, "curruent" should be --current--;
Col. 25, line 44, "perfomred" should be --performed--;
Col. 26, line 33, "$e_{re}$" should be --$e_{r3}$--;
Col. 27, line 62, "$r_{r3}$" should be --$e_{r3}$--.

Signed and Sealed this

Third Day of July 1979

[SEAL]

Attest:

LUTRELLE F. PARKER

Attesting Officer   Acting Commissioner of Patents and Trademarks